(12) United States Patent  
Kristem et al.

(10) Patent No.: US 11,765,659 B2
(45) Date of Patent: *Sep. 19, 2023

(54) METHODS AND ARRANGEMENTS TO SUPPORT WAKE-UP RADIO PACKET TRANSMISSION

(71) Applicant: INTEL CORPORATION, Santa Clara, CA (US)

(72) Inventors: Vinod Kristem, San Jose, CA (US); Shahrnaz Azizi, Cupertino, CA (US); Thomas J. Kenney, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/856,499

(22) Filed: Jul. 1, 2022

(65) Prior Publication Data

US 2022/0346013 A1  Oct. 27, 2022

Related U.S. Application Data

(63) Continuation of application No. 16/157,149, filed on Oct. 11, 2018, now Pat. No. 11,576,123.

(Continued)

(51) Int. Cl.
*H04L 27/02* (2006.01)
*H04L 27/26* (2006.01)
(Continued)

(52) U.S. Cl.
CPC ......... *H04W 52/0229* (2013.01); *H04L 27/02* (2013.01); *H04L 27/2602* (2013.01);
(Continued)

(58) Field of Classification Search
CPC ... H04L 5/0007; H04L 27/02; H04L 27/2602; H04L 27/2605; H04L 27/2613; H04L 27/2675; H04W 52/0229; H04W 80/02
See application file for complete search history.

(56) References Cited

U.S. PATENT DOCUMENTS 7,218,682 B2  5/2007 Mayor
8,675,482 B1  3/2014 Lu
(Continued)

FOREIGN PATENT DOCUMENTS

WO  2019010307 A1  1/2019
WO  2019027159 A1  2/2019
(Continued)

OTHER PUBLICATIONS

Abedi et al. "MAC and Security Baseline Proposal—Normative Text", IEEE P802.15 Working Group for Wireless Personal Area Networks (WPANs), Mar. 16, 2010, 127 pages.

(Continued)

*Primary Examiner* — Alpus Hsu
(74) *Attorney, Agent, or Firm* — KDW Firm PLLC

(57) ABSTRACT

Logic may define one or more wake-up preambles suitable for high data rates for a wake-up radio (WUR) packet. Logic may define wake-up preamble with different counts of symbols. Logic may generate a wake-up preamble as an on-off keying (OOK) signal. Logic may generate and receive a wake-up preamble that signals a high data transmission rate with respect to data rates defined for WUR packet transmissions. Logic may generate or receive a preamble that signals a rate of transmission of the WUR packet as 250 kilobits per second. Logic may transmit or receive bits of the wake-up preamble as two microsecond orthogonal frequency-division multiplexing (OFDM) based pulses, wherein each two microsecond OFDM based pulse is based on a 32-point Fast Fourier Transform (FFT) in a 20 Megahertz (MHz) bandwidth, with a subcarrier spacing of 625 Kilohertz (KHz) to produce six subcarriers in a four MHz bandwidth.

26 Claims, 11 Drawing Sheets

Related U.S. Application Data

(60) Provisional application No. 62/571,151, filed on Oct. 11, 2017.

(51) Int. Cl.
  *H04W 52/02* (2009.01)
  *H04L 5/00* (2006.01)
  *H04W 80/02* (2009.01)

(52) U.S. Cl.
  CPC ...... *H04L 27/2605* (2013.01); *H04L 27/2613* (2013.01); *H04L 27/26025* (2021.01); *H04L 27/2675* (2013.01); *H04L 5/0007* (2013.01); *H04W 80/02* (2013.01)

(56) References Cited

U.S. PATENT DOCUMENTS

| | | | |
|---|---|---|---|
| 9,485,733 | B1 | 11/2016 | Park |
| 9,591,565 | B2* | 3/2017 | Park ............... H04W 52/0209 |
| 9,634,757 | B2 | 4/2017 | Huang |
| 9,749,958 | B1 | 8/2017 | Segev |
| 9,826,482 | B2* | 11/2017 | Park ............... H04W 52/0229 |
| 10,091,728 | B2 | 10/2018 | Yang |
| 10,129,064 | B1 | 11/2018 | Lee |
| 10,321,402 | B2 | 6/2019 | Park |
| 10,341,149 | B2 | 7/2019 | Park |
| 10,362,538 | B2 | 7/2019 | Gao |
| 2004/0224728 | A1 | 11/2004 | daCosta |
| 2009/0046682 | A1 | 2/2009 | Kim |
| 2011/0074552 | A1 | 3/2011 | Norair |
| 2014/0185501 | A1 | 7/2014 | Park |
| 2016/0373237 | A1 | 12/2016 | Shellhammer |
| 2017/0094600 | A1 | 3/2017 | Min |
| 2017/0111858 | A1 | 4/2017 | Azizi |
| 2018/0007629 | A1 | 1/2018 | Dorrance |
| 2018/0019902 | A1 | 1/2018 | Suh |
| 2018/0077641 | A1 | 3/2018 | Yang |
| 2018/0084501 | A1 | 3/2018 | Mu |
| 2018/0152333 | A1 | 5/2018 | Shellhammer |
| 2018/0176053 | A1 | 6/2018 | Park |
| 2018/0184377 | A1* | 6/2018 | Kenney ............... H04W 4/80 |
| 2018/0184378 | A1 | 6/2018 | Fang |
| 2018/0184379 | A1 | 6/2018 | Liu |
| 2018/0192373 | A1* | 7/2018 | Fang ............... H04L 27/06 |
| 2018/0206193 | A1 | 7/2018 | Adachi |
| 2018/0242249 | A1 | 8/2018 | Yang |
| 2018/0279224 | A1 | 9/2018 | Yang |
| 2018/0288703 | A1 | 10/2018 | Sun |
| 2018/0302901 | A1 | 10/2018 | Suh |
| 2018/0343614 | A1* | 11/2018 | Cao ............... H04W 28/065 |
| 2018/0376370 | A1 | 12/2018 | Shellhammer |
| 2019/0007904 | A1 | 1/2019 | Asterjadhi |
| 2019/0069231 | A1 | 2/2019 | Kneckt |
| 2019/0082385 | A1 | 3/2019 | Shellhammer |
| 2019/0082390 | A1* | 3/2019 | Azizi ............... H04L 5/0053 |
| 2019/0124596 | A1 | 4/2019 | Cao |
| 2019/0208470 | A1 | 7/2019 | Asterjadhi |
| 2019/0246356 | A1 | 8/2019 | Kim |
| 2019/0260624 | A1 | 8/2019 | Park |
| 2019/0268192 | A1 | 8/2019 | Lim |
| 2019/0281549 | A1 | 9/2019 | Gan |
| 2019/0289549 | A1 | 9/2019 | Lim |
| 2019/0394726 | A1 | 12/2019 | Gan |
| 2020/0029276 | A1 | 1/2020 | Kim |
| 2020/0037251 | A1 | 1/2020 | Du |
| 2020/0045635 | A1 | 2/2020 | Lin |
| 2020/0053648 | A1 | 2/2020 | Guo |
| 2020/0059342 | A1 | 2/2020 | Sahin |
| 2020/0092811 | A1 | 3/2020 | Park |
| 2020/0178178 | A1 | 6/2020 | Huang |
| 2020/0245137 | A1 | 7/2020 | Chitrakar |
| 2020/0275373 | A1 | 8/2020 | Hwang |
| 2020/0288396 | A1 | 9/2020 | Park |
| 2020/0322889 | A1 | 10/2020 | Chitrakar |
| 2020/0359320 | A1 | 11/2020 | Chun |
| 2020/0367181 | A1 | 11/2020 | Lim |
| 2021/0227471 | A1 | 7/2021 | Chitrakar |
| 2021/0258877 | A1 | 8/2021 | Chitrakar |
| 2022/0141770 | A1 | 5/2022 | Ahn |

FOREIGN PATENT DOCUMENTS

| | | |
|---|---|---|
| WO | 2019049576 A1 | 3/2019 |
| WO | 2019093811 A1 | 5/2019 |

OTHER PUBLICATIONS

Marvel (MUR Legacy Preamble Design, 2017, IEEE 802.11-17/0647r1.

Marvel (MUR preamble SYNC Field Design, 2017, IEEE 802.11-17/0983r0).

Non-Final Rejection for the U.S. Appl. No. 16/130,646, dated May 28, 2021, 12 pages.

Non-Final Rejection for the U.S. Appl. No. 16/130,646, dated Feb. 8, 2021, 16 pages.

Non-Final Rejection for the U.S. Appl. No. 16/130,646, dated Feb. 28, 2020, 15 pages.

Non-Final Rejection for the U.S. Appl. No. 16/219,517, dated Jul. 15, 2021, 64 pages.

Non-Final Rejection for the U.S. Appl. No. 16/219,517, dated Feb. 19, 2021, 58 pages.

Final Rejection for the U.S. Appl. No. 16/219,517, dated Oct. 23, 2020, 66 pages.

Non-Final Rejection for the U.S. Appl. No. 16/219,517, dated Mar. 31, 2020, 85 pages.

* cited by examiner

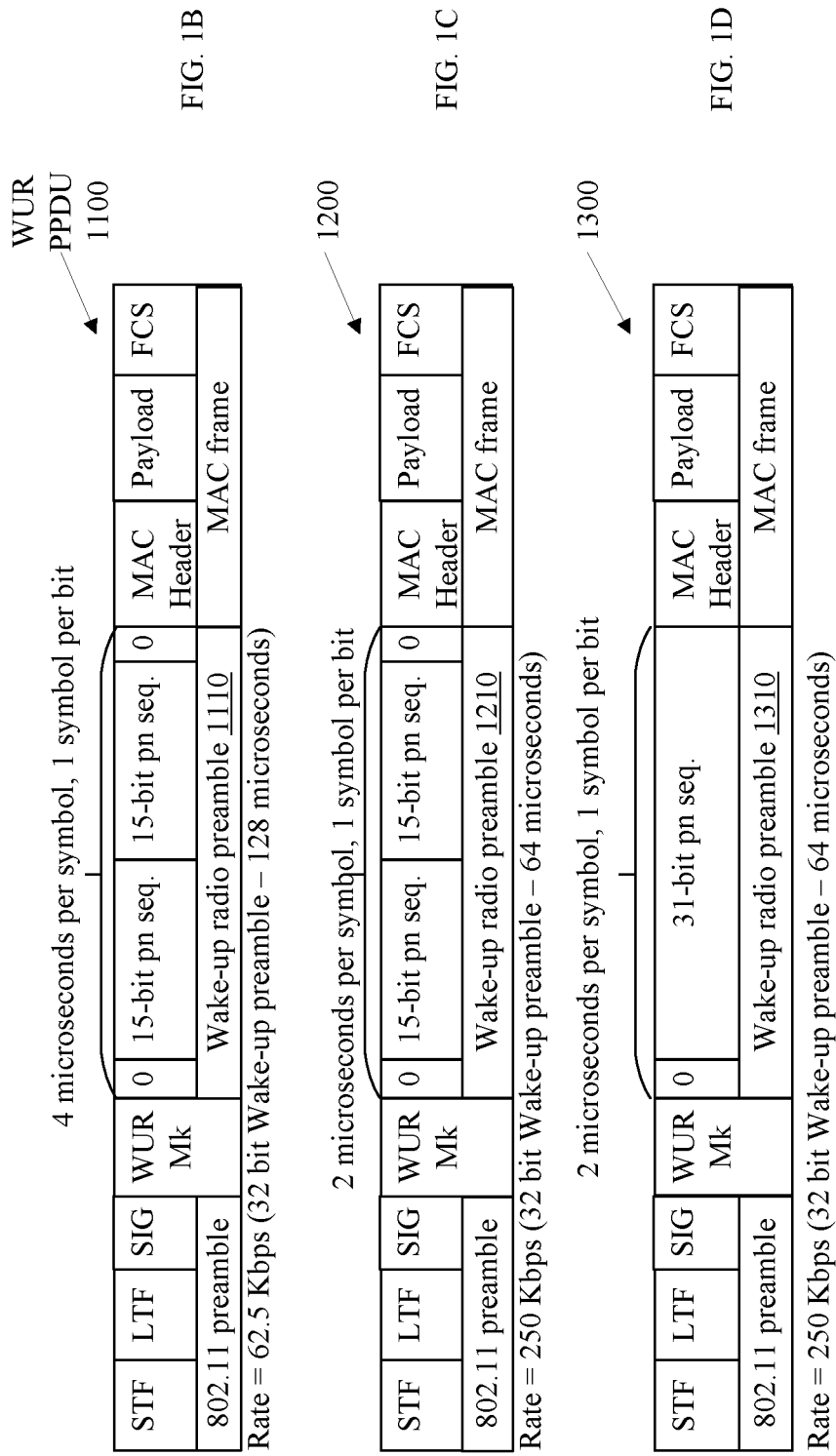

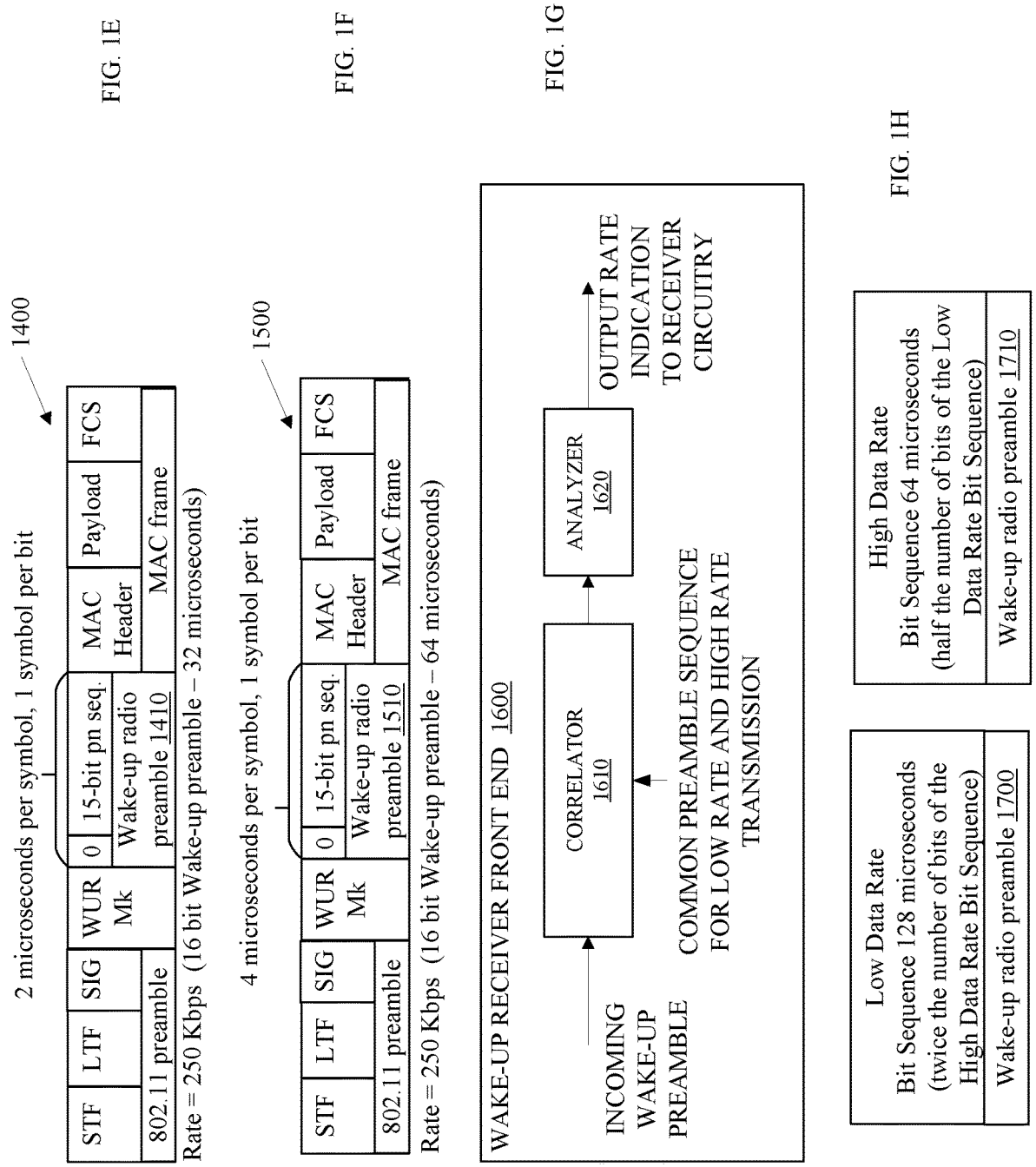

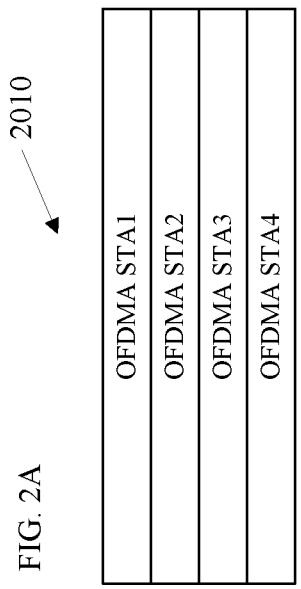
FIG. 2A
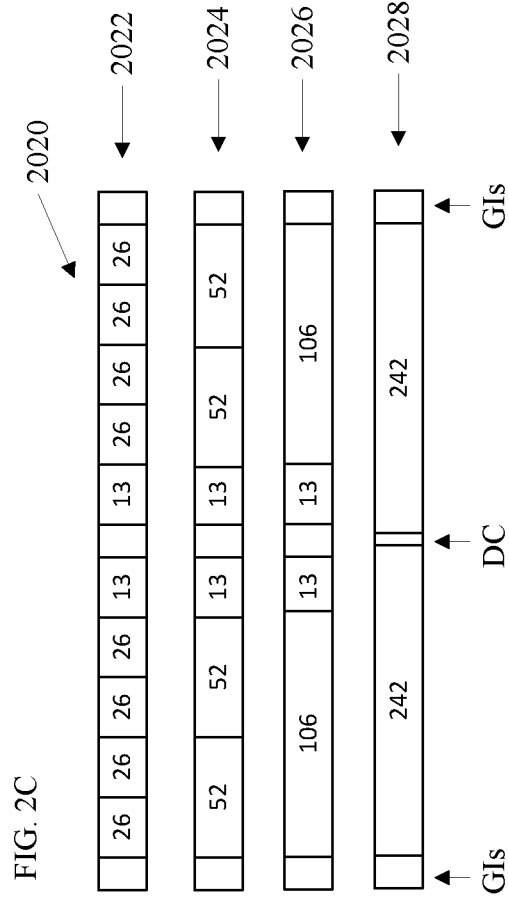
FIG. 2B
FIG. 2C

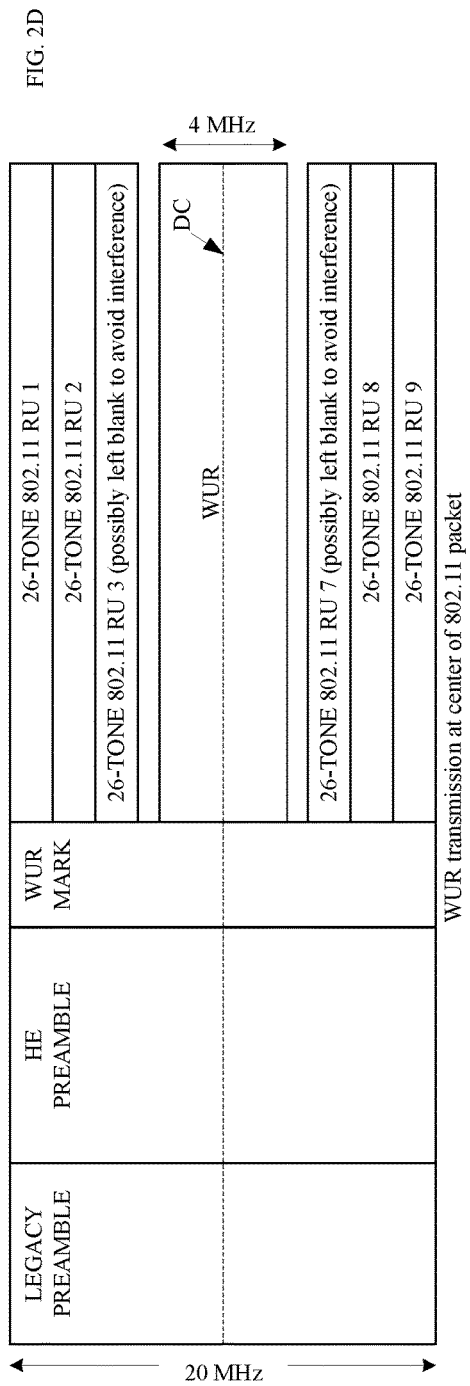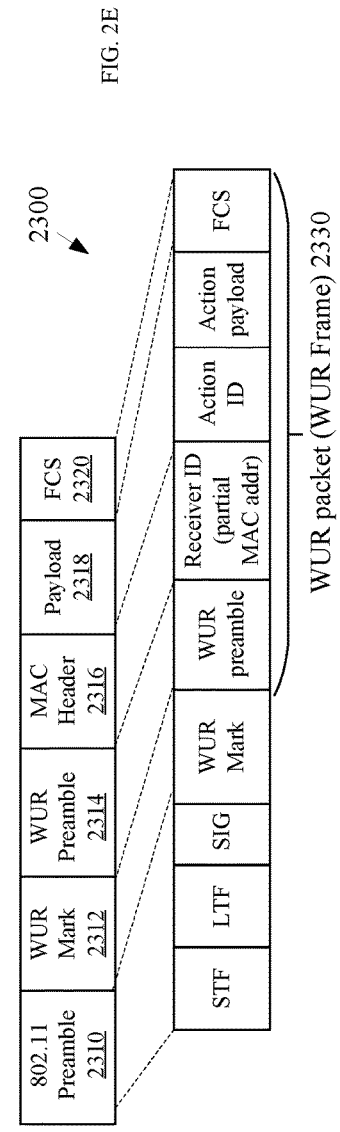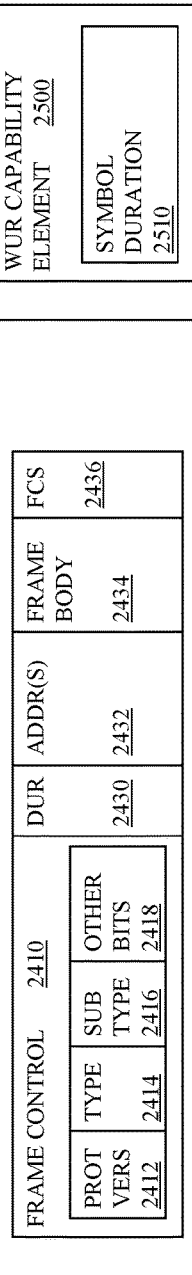

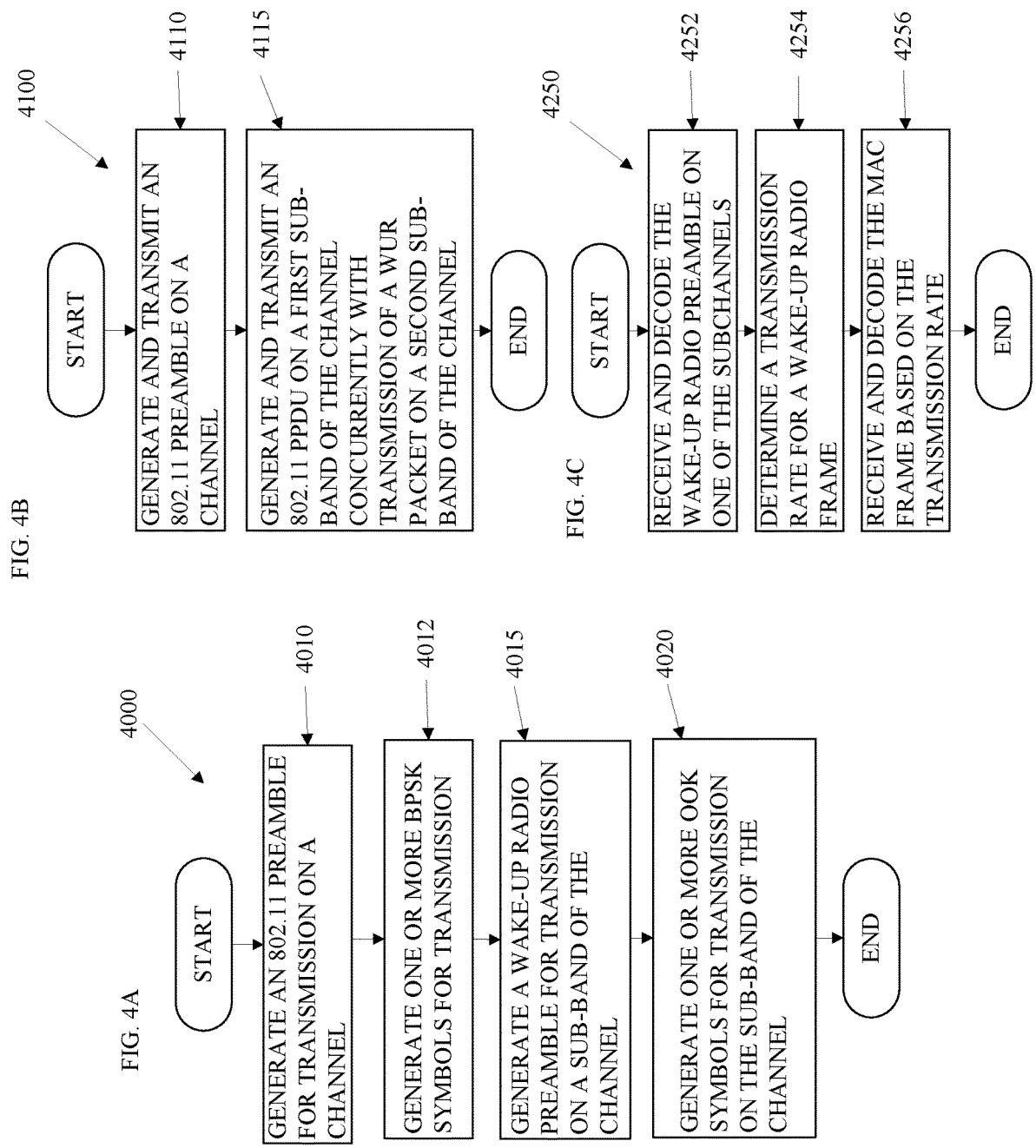

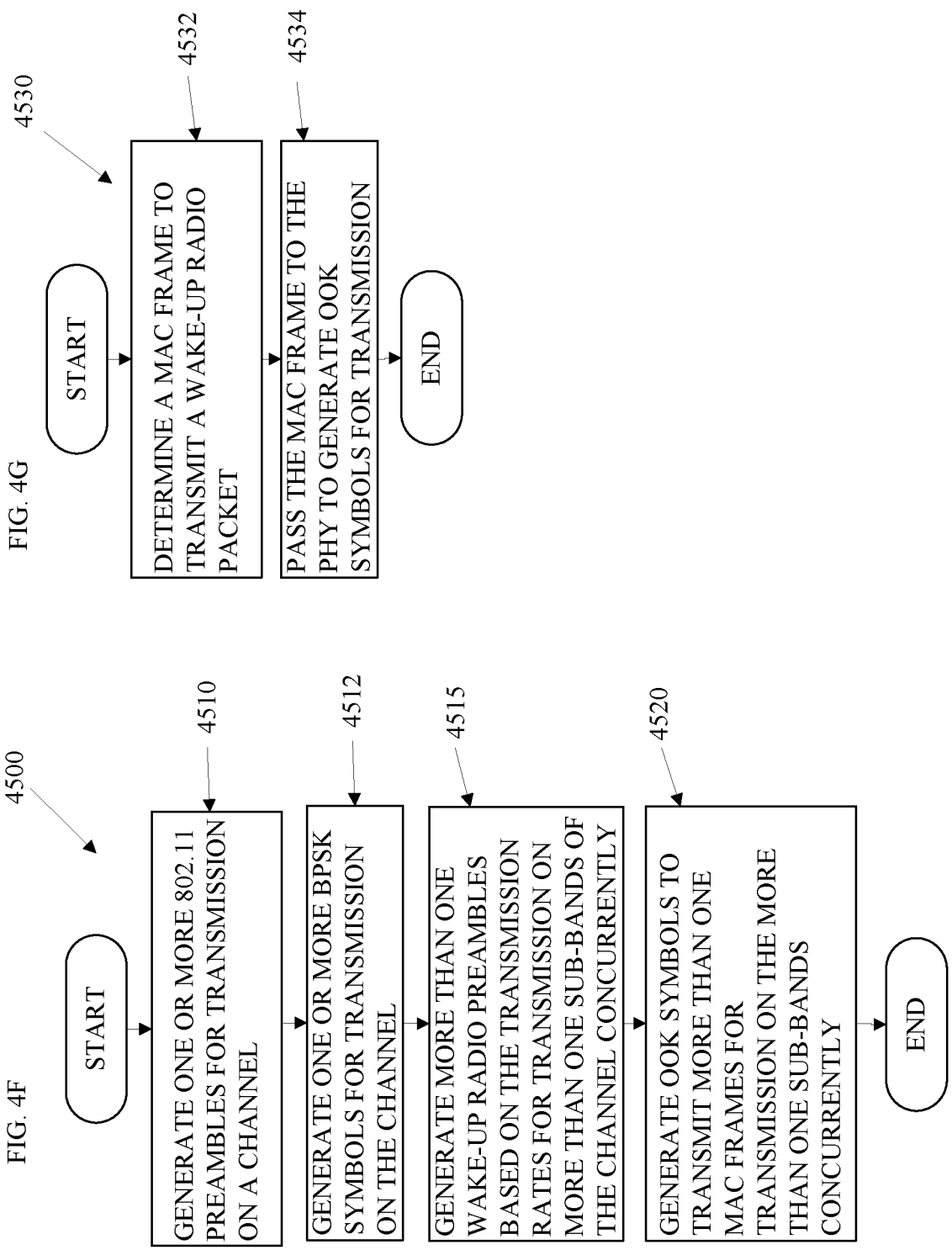

METHODS AND ARRANGEMENTS TO SUPPORT WAKE-UP RADIO PACKET TRANSMISSION

CROSS REFERENCE TO RELATED APPLICATIONS

This application is a continuation of, claims the benefit of and priority to previously filed U.S. patent application Ser. No. 16/157,149 filed Oct. 11, 2018, entitled "METHODS AND ARRANGEMENTS TO SUPPORT WAKE-UP RADIO PACKET TRANSMISSION", which is a continuation of, claims the benefit of and priority to previously filed U.S. Provisional Patent Application Ser. No. 62/571,151 filed Oct. 11, 2017, entitled "METHODS AND ARRANGEMENTS TO SUPPORT WAKE-UP PACKET TRANSMISSION", which are hereby incorporated by reference in their entireties.

TECHNICAL FIELD

Embodiments are in the field of wireless communications. More particularly, embodiments may support low and high transmission rates for wake-up radio packet transmissions.

BACKGROUND

The increase in interest in network and Internet connectivity and Internet of Things (IoT) drives design and production of new wireless products. Low power consumption is a design factor to facilitate greater usage of wireless devices such as mobile devices and wearable devices. Wireless communication interfaces can consume significant amounts of power, so product designs strike a balance between connectivity and power consumption. Thus, a design goal is to lower the power consumption by the wireless communication interfaces to facilitate increased connectivity in terms of distance, speed, and duration of wireless communications.

BRIEF DESCRIPTION OF THE DRAWINGS

FIG. 1B-F depicts an embodiment of a wake-up preamble to support a low transmission rate for wake-up radio packet transmission and wake-up preambles to support a high transmission rate for wake-up radio packet transmission;

FIG. 1G depicts an embodiment of wake-up receiver (WURx) front end of WUR circuitry, such as the WUR circuitry illustrated in FIG. 1A, that includes a correlator and an analyzer to detect a data rate for a data portion of a WUR packet;

FIG. 1H depicts an embodiment of preambles for high data rate (HDR) and low data rate (LDR);

FIG. 2A depicts an embodiment of transmissions between four stations and an AP;

FIG. 2B depicts an embodiment of a transmission between one station and an AP;

FIG. 2C depicts an embodiment of a resource units in a 20 Megahertz (MHz) bandwidth;

FIG. 2D depicts an embodiment of an IEEE 802.11ax orthogonal frequency-division multiple access (OFDMA) modulated signal with a compatible wake-up radio signal at the center resource unit;

FIG. 2E depicts an embodiment of a wake-up radio packet prepended by an IEEE 802.11 physical layer preamble;

FIG. 2F depicts an embodiment of a management frame;

FIG. 2G depicts an embodiment of a wake-up radio capability element;

FIG. 4A depicts an embodiment of a flowchart to generate and transmit frames for communications between wireless communication devices; and FIG. 4B depicts an embodiment of a flowchart to generate frames for communications between wireless communication devices;

FIG. 4C depicts an embodiment of a flowchart to receive and interpret frames for communications between wireless communication devices;

FIGS. 4F-G depict embodiments of flowcharts to generate and determine frames for communications between wireless communication devices;

DETAILED DESCRIPTION OF EMBODIMENTS

Figure 1A:
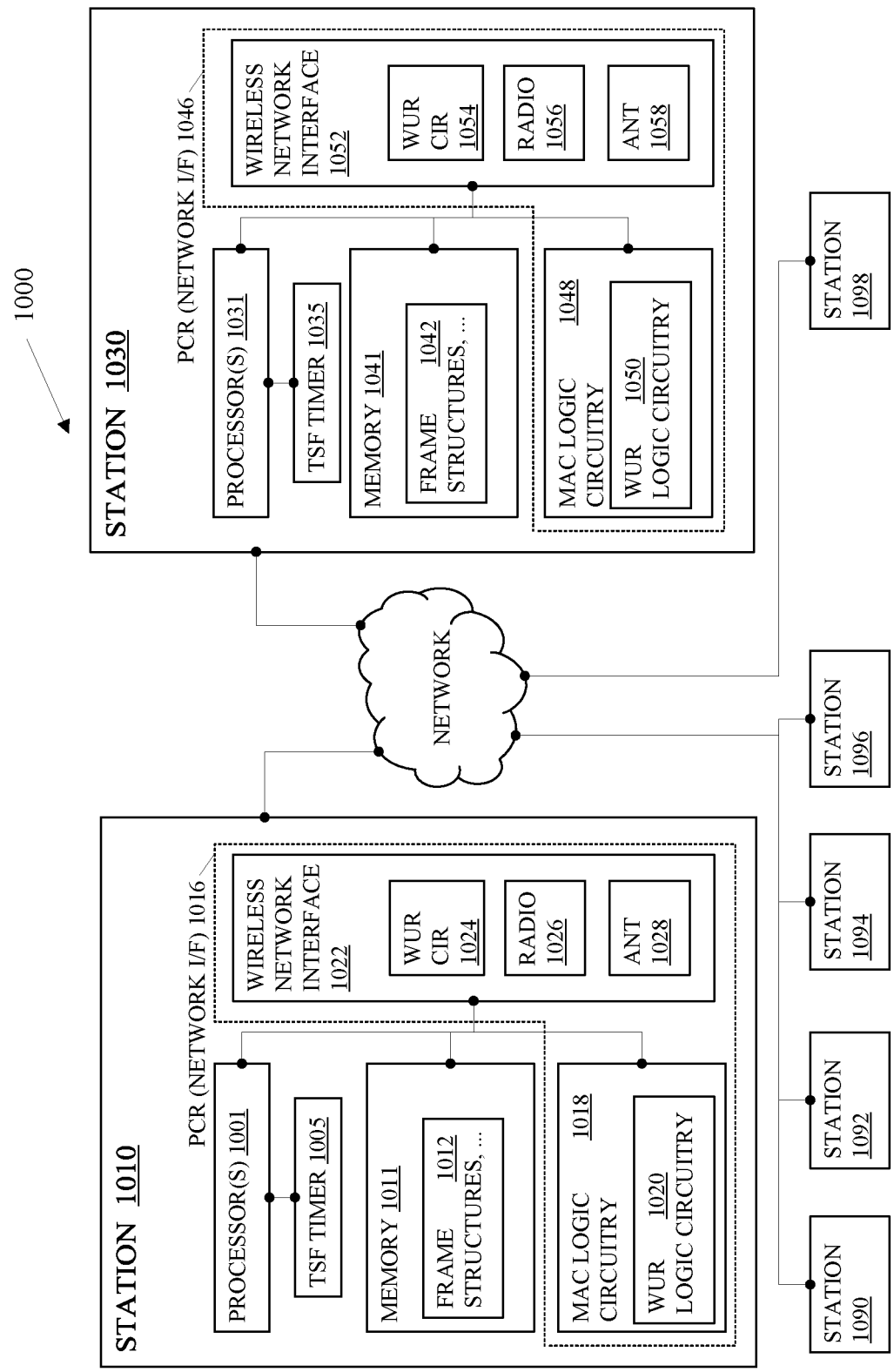
FIG. 1A depicts an embodiment of a wireless network to support low and high transmission rates for wake-up radio packet transmission.

The following is a detailed description of embodiments depicted in the drawings. The detailed description covers all modifications, equivalents, and alternatives falling within the appended claims.

Embodiments may reduce power consumption in wireless communication interfaces by using a low-power wake-up receiver (LP-WURx or WURx) in conjunction with a main Wi-Fi radio, referred to as a primary connectivity radio (PCR) or a main connectivity radio in a station. The WURx remains active in a wake-up radio (WUR) mode while the PCR enters a power save state or sleep state to reduce power consumption. When communication with the PCR is requested or needed, a station such as a peer station or an access point (AP) may transmit a WUR physical layer protocol data unit (PPDU) with a wake-up packet (WUP) to instruct the WURx to wake the PCR.

Some embodiments may transmit the WUP signal with an amplitude-shift keying (ASK) modulation such as On-Off Keying (OOK) to achieve a low cost, low power solution. The use of OOK modulation significantly simplifies the hardware involved with the WUR and increases the sensitivity of the wireless communications interface (aka wireless network interface). Furthermore, many embodiments utilize current physical layer (PHY) configurations by implementing the OOK signal with an orthogonal frequency division multiplexing (OFDM) symbols.

Some embodiments may leave the WURx powered on (in an active state) continuously. Further embodiments employ cycling of the WURx while in the WUR mode and while the PCR is in a power save mode to further reduce power consumption. For instance, one embodiment may turn on the WURx every second with, e.g., a 50% duty cycle, to reduce power consumption with a slight increase in nominal latency. Another embodiment may turn on the WURx every fourth cycle (25% duty cycle) or turn off the WURx every fourth cycle (75% duty cycle).

Embodiments may facilitate transmission of the WUR frame (aka WUR packet) in an Institute of Electrical and Electronics Engineers (IEEE) 802.11 multi-user, orthogonal frequency-division multiple access (OFDMA) packet format referred to as a WUR PPDU such as an IEEE 802.11ax OFDMA packet format. The WUR PPDUs may have a 20, 40, 60, 80, or 160 megahertz (MHz) bandwidth.

In some embodiments, the WUR may transmit a WUR frame after the WUR PPDU preamble with a 4 megahertz (MHz) bandwidth without transmitting packets in other sub-bands of the channel. In further embodiments, the WUR may transmit one or more WUR frames after the WUR PPDU preamble with 4 megahertz (MHz) bandwidths along with packets in other formats such as 802.11ax packets in other sub-bands of the channel with a 2 MHz or greater bandwidth, via orthogonal frequency division multiple access (OFDMA).

In several embodiments, the WUR may transmit WUR frames at transmission rates such as 62.5 kilobits per second (kbps) and/or 250 kbps, within a multi-user, OFDMA packet or as a standalone packet. An example is a physical layer (PHY) device that generates signals to transmit the WUR frame at the center of the band in a multi-user OFDMA transmission that multiplexes IEEE 802.11 transmissions in frequency within the same multi-user OFDMA packet. In other words, the PHY generates signals to transmit multiple different packets on different resource units (RUs) or frequency sub-bands within the channel simultaneously. In other embodiments, the PHY device may generate signals to transmit the WUR frame at a sub-band that is not at the center of the band of the communication channel.

One embodiment may have only one data rate for transmission of WUR frame to meet the requirements of a WUR with very simple reduced hardware complexity with low cost. Other embodiments may enable two or more data rates for WUR frame transmissions. For instance, embodiments may enable two or more data rates such as (1) a low data rate (LDR), e.g., 62.5 kilobits per second (kbps), to meet the IEEE 802.11b/11ax-extended range mode link budget and range and (2) a higher data rate, such as 250 kbps to have shorter packet transmission times, to match (exceed) the link budget of repetition rates in previous Wi-Fi standards. Some embodiments may comprise two different packet and/or preamble formats for WUR frames for use as a signaling method for the data transmission rate of the WUR frame.

In several embodiments, the WUR may signal the LDR or the HDR based on selection of the preamble. For instance, the WUR may signal the LDR with a first preamble and the HDR with the second preamble to avoid the overhead associated with signaling via signal field bits. In other words, a WURx may be capable of identifying and, in some embodiments, distinguishing at least two different WUR preambles, the first WUR preamble to signal the LDR and the second WUR preamble to signal the HDR.

In some embodiments, a WUR preamble to signal the LDR may have a different number of symbols or bits than the WUR preamble to signal the HDR. In further embodiments, the WUR preamble to signal the LDR may transmit with a different duration than the WUR preamble to signal the HDR. For example, the WUR preamble to signal the LDR may have a duration that is twice the duration of the WUR preamble to signal the HDR and may also have twice the number of bits or symbols as the WUR preamble to signal the HDR. In further embodiments, the duration of the WUR preamble to signal the LDR is 128 microseconds.

As a further example, the WUR preamble to signal the HDR may have a duration that is half the duration of the WUR preamble to signal the LDR and may also have half the number of bits or symbols as the WUR preamble to signal the LDR. In further embodiments, the duration of the duration of the WUR preamble to signal the HDR is 64 microseconds. In one embodiment, the WUR may transmit a 32-bit WUR preamble to signal the HDR. In several embodiments, one bit is one symbol but other embodiments may differ.

In many embodiments, the WUR may transmit the OOK OFDM symbols with 2-microsecond or 4-microsecond pulses and 4 MHz bandwidths. In several embodiments, the WUR may generate the 2-microsecond pulse by masking of bits of a 4-microsecond pulse. Examples of OOK symbols for the 2-microsecond pulse are $\{1,0,1,0,1,0,0,0,-1,0,1,0,-1\}$ and $\{1,0,1,0,-1,0,0,0,-1,0,-1,0,1\}$. Examples of OOK symbols for the 4-microsecond pulse are $\{1,1,1,-1,-1,-1,0,-1,1,-1,-1,1,-1\}$ and $(1+j)\{1,-1,1,-1,-1,1,0,-1,-1,1,1,1,1\}$.

Some embodiments are particularly directed to improvements for wireless local area network (WLAN), such as a WLAN implementing one or more Institute of Electrical and Electronics Engineers (IEEE) 802.11 standards (sometimes collectively referred to as "Wi-Fi"). Such standards may include, for instance, the IEEE 802.11-2016, published Mar. 29, 2012, and the IEEE 802.11ax/D1.4, published August 2017. The embodiments are not limited to these standards.

To achieve the target of very low power consumption WUR, embodiments implement waveforms and techniques that allow extremely simple and low cost, low power hardware solutions. This is departure from previous versions of the Wi-Fi standard. One embodiment includes hardware that uses an inexpensive, very low power radio frequency (RF) section with a minimal baseband solution. Some embodiments include a PCR and a WURx and no corresponding WUR transmitter. Some embodiments include a PCR and a WUR transmitter and no corresponding WURx. Some embodiments include a PCR and both a WUR transmitter and a corresponding WURx. Other embodiments implement techniques that are more complicated requiring more hardware/cost and power. Different embodiments may provide preferable performance in different deployments or in different scenarios at various price points and power consumption levels.

Embodiments may increase spatial reuse (SR) of Wi-Fi communications with multiple different bandwidths at different frequency bands. Many embodiments focus on bands between 1 Gigahertz (GHz) and 6 GHz. Some embodiments focus on bandwidths such as 20 Megahertz (MHz), 40 MHz, 80 MHz, 160 MHz, and 80+80 MHz, while other embodiments focus on other bandwidths in the same or other frequency bands. However, the embodiments are not limited to the bandwidths and frequency bands described herein.

Various embodiments may be designed to address different technical problems associated with generating and encoding and receiving and decoding a wake-up radio packet; generating and transmitting a wake-up radio packet with a 4 MHz bandwidth; identifying a data rate for a wake-up radio packet; generating and transmitting signaling to identify a data rate for a MAC frame in a wake-up radio packet without impacting the size or duration of the wake-up radio packet; and/or the like.

Different technical problems such as those discussed above may be addressed by one or more different embodiments. Embodiments may address one or more of these problems associated with generation and transmission receipt and interpretation of a wake-up radio packet. For instance, some embodiments that address problems associated with generation and transmission, receipt, decoding, and interpretation of a wake-up radio packet may do so by one or more different technical means, such as, generating or decoding, by physical layer (PHY) logic circuitry, a wake-up radio packet, wherein the wake-up radio packet comprises an on-off keying (OOK) signal, a preamble of the wake-up radio packet to indicate a rate of transmission of one or more OOK orthogonal frequency-division multiplexing (OFDM) symbols of a medium access control (MAC) frame of the wake-up radio packet, wherein the preamble comprises a first preamble to signal a high data rate or a second preamble to signal a low data rate, the first preamble and the second preamble to have different bit counts, wherein a length in bits of the second preamble is twice a length in bits of the first preamble; communicating OFDM symbols of an WUR PPDU preamble on a channel followed by OOK OFDM symbols of the wake-up radio packet on a sub-band of the channel; wherein the wake-up radio packet comprises one or more resource units at a center of a multi-user, orthogonal frequency-division multiple access (OFDMA) modulated signal, at least a second wake-up radio packet to transmit on a contiguous channel bandwidth with OOK OFDM symbols on a sub-band of the contiguous channel bandwidth; further comprising a processor, a memory coupled with the processor, a radio coupled with a physical layer device, and one or more antennas coupled with the radio to transmit a wake-up radio (WUR) physical layer protocol data unit (PPDU) with a wide bandwidth preamble, the wide bandwidth preamble having a bandwidth between 20 megahertz (MHz) and 80 MHz, followed by OOK OFDM symbols of the WUR packet on a sub-band of a channel; wherein the rate of transmission of one OOK OFDM symbol of the MAC frame of the WUR packet is set to the rate of transmission of 62.5 kilobits per second for the low data rate; the second preamble to signal the low data rate of 62.5 kilobits per second; the second preamble to transmit with a duration of 128 microseconds; the PHY logic circuitry to generate one WUR packet in a 20 MHz channel, two WUR packets in a 40 MHz channel, or four WUR packets in an 80 MHz channel; wherein the rate of transmission of one OOK OFDM symbol of the MAC frame of the WUR packet is set to the rate of transmission of 250 kilobits per second for the high data rate; the first preamble to signal the high data rate of 250 kilobits per second; the first preamble to transmit with a duration of 64 microseconds; the first preamble to comprise 32 bits; and/or the like.

Several embodiments comprise central servers, access points (APs), and/or stations (STAs) such as modems, routers, switches, servers, workstations, netbooks, mobile devices (Laptop, Smart Phone, Tablet, and the like), sensors, meters, controls, instruments, monitors, home or office appliances, Internet of Things (IoT) gear (watches, glasses, headphones, and the like), and the like. Some embodiments may provide, e.g., indoor and/or outdoor "smart" grid and sensor services. In various embodiments, these devices relate to specific applications such as healthcare, home, commercial office and retail, security, and industrial automation and monitoring applications, as well as vehicle applications (automobiles, self-driving vehicles, airplanes, and the like), and the like.

Embodiments may facilitate wireless communications in accordance with multiple standards. Some embodiments may comprise low power wireless communications like Bluetooth®, cellular communications, and messaging systems. Furthermore, some wireless embodiments may incorporate a single antenna while other embodiments may employ multiple antennas or antenna elements.

While some of the specific embodiments described below will reference the embodiments with specific configurations, those of skill in the art will realize that embodiments of the present disclosure may advantageously be implemented with other configurations with similar issues or problems.

Turning now to FIG. 1A, there is shown an embodiment of a system 1000 to transmit or receive a WUR packet as well as to generate, transmit, receive, decode, and interpret simultaneous transmissions between an access point (AP) and multiple stations (STAs) associated with the AP. The plurality of communications devices comprises STAs 1010 and 1030, and STAs 1090, 1092, 1094, 1096, and 1098. The STA 1010 may be wired and wirelessly connected to each of the STAs 1030, 1090, 1092, 1094, 1096, and 1098 and the STA 1010 may comprise an access point (AP) or a peer device.

Each STA 1030, 1090, 1092, 1094, 1096, and 1098 may associate with the STA 1010. After associating with the STA 1010, each STA 1030, 1090, 1092, 1094, 1096, and 1098 may receive a channel sounding packet for beamforming their respective primary connectivity radios (PCRs) such as the PCR 1046 of the STA 1030. In many embodiments, the channel sounding packet may comprise a physical layer (PHY) null data packet (NDP). For instance, the channel sounding packet may include a very high throughput (VHT) NDP or a high efficiency (HE) NDP. In some embodiments, the medium access control (MAC) logic circuitry may control the timing of transmission of the channel sounding packet.

In the present embodiment, the STA 1010 comprises a PCR 1016 and a wake-up radio (WUR) transmitter. The WUR transmitter may comprise WUR logic circuitry 1020 integrated with the MAC logic circuitry 1018 and WUR circuitry 1024 integrated with the wireless network interface (I/F) 1022. The WUR transmitter may comprise a distinct wireless interface that is a distinct piece of hardware from the PCR 1016 of the STA 1010 and possibly may reside in a separate package, or may implement portions of the PCR 1016 as part of the WUR transmitter. In other words, the WUR transmitter reuse or not reuse portions of the PCR 1016 circuitry. In other embodiments, such as embodiments of peer stations that are battery-operated devices, relay devices, or repeater devices; the peer stations such as STA 1010 may comprise both a WUR transmitter and a wake-up receiver (WURx).

In the present embodiment, the STA 1030 comprises a PCR 1046 and a WURx. The WURx may comprise WUR logic circuitry 1050 integrated with the MAC logic circuitry 1048 and WUR circuitry 1054 integrated with the wireless network interface (I/F) 1052. The WURx may comprise a distinct wireless interface that is a distinct piece of hardware from the PCR 1046 of the STA 1030 and possibly may reside in a separate package, or may implement portions of the PCR 1046 as part of the WURx. In other embodiments, such as embodiments of stations that are battery-operated devices, the devices such as STA 1030 may comprise both a WUR transmitter and a WURx.

For WUR compatible STAs (also referred to as WUR STAs) such as the STA 1030, the STA 1010 can implement the WUR operation (or functionality). The WUR operation may allow the STA 1030 to enter a WUR mode in which the PCR 1046 of the STA 1030 is in a low power consumption state such as a sleep state or a doze state and in which the PCR 1046 of the STA 1030 is unavailable to receive communications. Advantageously, while the STA 1030 is in the WUR mode, the STA 1010 can wake the PCR 1046 of the STA 1030 by transmitting a WUP to the STA 1030 that is addressed to the WURx of the STA 1030, broadcast to a group of WURx's including the WURx of the STA 1030, or broadcast generally to all STAs.

The STA 1010 may transmit the WUP as part of a WUR PHY protocol data unit (PPDU). The WUR PPDU may comprise, e.g., a 20 MHz bandwidth packet for transmission on a 20 MHz or greater channel with the WUP on a 4 MHz subchannel of the 20 MHz channel and, possibly, other packets on other resource units (RUs) of the 20 MHz channel. In several embodiments, the STA 1010 may transmit the WUP with 2-microsecond pulses of orthogonal frequency division multiplexing (OFDM) symbols via orthogonal frequency division multiple access (OFDMA). In other embodiments, the WUR waveform could be created using other modulation types like just On-Off keying using a time domain waveform. The WUP may comprise a minimal PHY packet with a PHY preamble and a medium access control (MAC) frame. The PHY preamble may comprise a WUR preamble that may identify, based on the configuration of the WUR preamble, a data rate for the data portion of the PHY frame, which is the MAC frame.

Many embodiments may transmit a WUR preamble of the WUR packet to synchronize with a WUR of another device. In some embodiments, the preamble structure may signal the rate of transmission, or data rate, for the WUR packet. Such embodiments may define at least one wake-up preamble for each data rate to distinguish the data rates with the preambles.

In several embodiments, the WUR transmitter of the STA 1010 may be capable of transmitting at least a first WUR preamble and a second WUR preamble. The first WUR preamble may signal a low data rate (LDR) such as 62.5 kilobits per second (kbps), and the second WUR preamble may signal a high data rate (HDR) such as 250 kbps. In some embodiments, the first WUR preamble may comprise twice the number of symbols or bits as the second WUR preamble and, in several embodiments, the first WUR preamble may comprise two repetitions of the second preamble.

The WURx of the STA 1030 may receive the WUP and, in response to receipt of the WUP, the STA 1030 may wake the PCR 1046 so the PCR 1046 can communicate with the STA 1010. The WURx of the STA 1030 may be integrated with the PCR 1046 or may comprise distinct circuitry. The PCR 1046 is a main radio for communication by the STA 1030, or at least one of the main radios, that can associate with a basic service set (BSS) via, e.g., an AP such as the STA 1010, or a peer device such as a personal basic service set (PBSS) control point (PCP). The PCR 1046 can negotiate WUR mode parameters for the WURx of the STA 1030 to describe the state of the WURx while in WUR mode. For instance, the PCR 1046 may negotiate a duty cycle for the WURx while in WUR mode that cycles the WURx between an active state and an inactive state while the PCR 1046 of the STA 1030 is in a doze state.

In the WUR mode, the PCR 146 may enter a sleep mode to save power and the WURx of the STA 1030 can awake the PCR 1046 in response to receipt of a WUP from, e.g., the STA 1010 to perform a scheduled service or an unscheduled service associated with the PCR 1046. For instance, the STA 1010 may manage a BSS and may negotiate a service period with the PCR 1046 to periodically transmit data packets such as Internet protocol (IP) packets to the PCR 1046 every 10 microseconds. The data packets may include the data in a frame body of the data frame. FIG. 2F illustrates an example of a frame 2400 that can be a data frame, with a frame body 2434 that can include a voice packet.

During the WUR mode, while the PCR 1046 is in a doze state, the service negotiated between the STA 1010 and the PCR 1046 is suspended. In other words, the STA 1010 maintains parameters about the negotiated service period with the PCR 1046 and the STA 1030 maintains parameters about the negotiated service period but neither the STA 1010 nor the PCR 1046 are required to adhere to the negotiated service period while the STA 1030 is in the WUR mode and the PCR 1046 is in a doze state.

In the present embodiment, at least part of the WURx of the STA 1030 is a part of the PCR 1046 that remains operational while the PCR 1046 is in the doze state in WUR mode. While the PCR 1046 is in the doze state in WUR mode, the PCR 1046 does not receive the voice frames from the STA 1010 but the STA 1010 may transmit a WUR PPDU with a WUP such as the WUR PPDUs illustrated in FIGS. 2D and 2E, to instruct the WURx of the STA 1030 to wake the PCR 1046 in STA 1030. Upon waking, the PCR 1046 may receive the voice packet from the STA 1010 in accordance with the parameters of the negotiated service period.

In some embodiments, the STA 1010 and the STA 1030, via the PCRs 1016 and 1046, respectively, may also negotiate a subchannel (or tone or subband) within which to transmit a WUR packet from the STA 1010 to the STA 1030. In other embodiments, the WUR of STA 1030 may always receive a WUR packet on the same subchannel of a channel. Note that the STA 1010 may comprise, e.g., an access point (AP) STA, and may transmit on channels with wide bandwidths of 20 MHz or greater. When the STA 1010 transmits to the WURx of the STA 1030, the STA 1010 may transmit the WUR packet on a subchannel of the, e.g., 20 MHz channel. From the perspective of the STA 1010, the 4 MHz bandwidth transmission of the WUR packet is a transmission on a "subchannel" of the 20 MHz or greater channel. From the perspective of the WURx of the STA 1030, the subchannel of the 20 MHz or greater channel may be referenced as the channel or the primary channel of the STA 1030 because, e.g., the WURx receives a 4 MHz bandwidth transmission and not the 20 MHz transmission.

FIGS. 1B-1E illustrate embodiments of wake-up preambles to signal low and high data rates for 62.5 Kbps and 250 Kbps for the data portion or MAC frame of a WUR packet. Some embodiments may implement different transmission rates for inclusion in a multi-user transmission. For instance, some embodiments may transmit WUR packets with packets associated with other standards such as IEEE 802.11ax, 802.11an, or 802.11ac.

Embodiments may transmit the WUR packets with On-Off Keying (OOK) modulation. To accomplish the OOK modulation, the STA 1010 transmits the OFDM symbol for a duration to indicate a logical one bit, such as two microseconds or four microseconds, and does not transmit the symbol for a duration, such as two microseconds or four microseconds, respectively, to indicate a logical zero bit. The STA 1010 may use the OFDM symbols to perform the OOK modulation, advantageously, to reuse an 802.11 Wi-Fi transmitter, to transmit the WUR packets. The STA 1010 may first generate a signal using OFDM with x subcarriers populated with data, where the number x depends on the bandwidth. Next the STA 1010 may perform an Inverse Fast Fourier Transform (IFFT) (like a normal OFDM transmission) to create a time-domain waveform based on the OFDM symbols. Then the STA 1010 may overlay a bit sequence of logical ones and zeros. The STA 1010 may overlay the signal by multiplying the bit sequence by the time-domain signal derived from the OFDM symbols. The STA 1010 does not transmit a signal for the parts of the time domain signal where the overlay bit sequence is zero and does transmit a signal for the parts of the time domain signal where the overlay is 1. This process creates the OOK modulated signals since the signal is either transmitted or not transmitted based on the bit sequences of the WUR packet.

A preamble duration of more than 64 microseconds may not be desirable for many high rate applications. Instead, some embodiments may use a 32-bit sequence with a bit duration of two microseconds or a 16-bit sequence with a bit duration (or pulse) of two microseconds or four microseconds. A bit duration of two microseconds means the STA 1010 transmits the signal for two microseconds for a logical 1 bit and does not transmit for two microseconds to communicate a logical zero bit. This higher length sequence (32-bit) can potentially have a smaller sidelobe levels than a 16-bit sequence and hence, advantageously, better detection capability in presence of interference and noise.

FIG. 1B illustrates an embodiment of a WUR packet 1100 with a wake-up preamble 1110 signaling a low data rate transmission of 62.5 Kbps for the data portion (or MAC frame) of the WUR packet. The WUR packet 1100 may comprise a wake-up packet, a WUR beacon, a WUR discovery frame, or the like. In some embodiments, the WUR packet is included in resource units (RUs) of a transmission with communications to other devices such as other WURxs and/or 802.11ax devices in other RUs.

The WUR packet 1100 comprises an 802.11 preamble, a WUR mark, a wake-up preamble 1110 and a MAC frame. The 802.11 preamble as illustrated, may be a legacy preamble that comprises a short training field (STF), a long training field (LTF), and a signal field (SIG). Some embodiments may employ more than one STF, more than one LTF, and/or more than one SIG. For instance, embodiments that transmit 802.11ax frames in other resource units of the WUR packet may include a legacy preamble similar to that shown as well as a high efficiency (HE) preamble as illustrated in FIG. 2D. For packets that are transmitted to one or more WURxs, the WUR packet 1100 may only include a legacy 802.11 preamble to communicate a network allocation vector (NAV) to legacy devices and legacy compatible devices in the BSS.

The WUR mark may include pulse or symbol to identify the forthcoming WUR packet 1100 to other devices. For instance, the WUR mark may include a Binary Phase-shift keying (BPSK)-modulated OFDM symbol to cause 802.11n devices to identify the WUR packet 1100 as a legacy 802.11a/g packet to prevent any coexistence issues. In such embodiments, transmission of the WUR Mark prior to the WUR preamble 1110 may avoid a false detection of the WUR packet 1100 by an 802.11n auto detection mechanism as an 802.11n packet with a higher probability. For situations of false detection, once a high throughput signal cyclic redundancy check (HT-SIG CRC) fails, the 802.11n devices drop the clear channel assessment (CCA) threshold to −62 dbm (decibel-milliwatts) of energy detect as opposed to −82 dbm of preamble detect. This is problematic and can cause collision and coexistence issues. The WUR mark may help 802.11 device to correctly set the CCA threshold setting. In other embodiments, the STA 1010 may implement the WUR mark with a different modulation and coding scheme.

In many embodiments, the STA 1010 may transmit the 802.11 preamble and the WUR mark at a 20 MHz bandwidth. In other embodiments, the STA 1010 may transmit the WUR mark at a different bandwidth than the 802.11 preamble. For instance, the STA 1010 may transmit the WUR mark at the same bandwidth as the transmission of the wake-up preamble 1110.

After transmitting the WUR mark, the STA 1010 may transmit the WUR preamble 1110. The STA 1010 may transmit the WUR preamble 1110 with an OOK modulation and, in some embodiments, may apply Manchester coding.

The WUR preamble 1110 may comprise a 32-bit bit sequence comprising a zero-bit followed by a first 15-bit PN sequence, a second 15-bit PN sequence, and a zero-bit. The station 1010 may transmit the wake-up preamble 1110 at one bit every four microseconds so the total transmission time for the wake-up preamble 1110 may be 128 microseconds.

In many embodiments, the first and second 15-bit sequence are two repetitions of the same 15 bit PN sequence. In other embodiments, the 15-bit PN sequences are different. In still other embodiments, the 15-bit sequences are not PN sequences.

After transmitting the WUR preamble 1110, the STA 1010 may transmit the MAC frame at a rate of 62.5 Kbps. To illustrate, some embodiments may transmit the MAC frame with one OOK chip transmission during a 4× symbol duration. The chip may represent a (1,0) for a logical one and a (0,1) for a logical zero with Manchester coding. Assuming that the OFDM 4× symbol duration is 12.8 microseconds and the cyclic prefix is nominally 3.2 microseconds, such embodiments transmit a chip every 16 microseconds and the transmission rate for the WUR packet is 62.5 kbps. In many embodiments, the PHY transmits the chip of (1,0) by transmitting the signal for 8 microseconds and not transmitting the signal for 8 microseconds. Similarly, the PHY transmits the chip of (0,1) by not transmitting the signal for 8 microseconds and transmitting the signal for 8 microseconds.

The MAC frame may be any type of WUR frame such as a beacon, a WUP, or the like. In some embodiments, the MAC frame may comprise an action frame such as the WUR frame illustrated in and discussed in conjunction with FIG. 2E.

After transmission of the WUR packet 1100 the WUR circuitry of the PHY of the receiving device, which is the STA 1030 in this embodiment, may detect the preamble, decode the rate of transmission (if capable of multiple rates), and decode the receiver address. In the present embodiment, the rate of transmission for the MAC frame is associated with the format of the WUR preamble 1110. In some embodiments, the rate of the transmission of the WUR preamble 1110 is constant regardless of the rate of transmission negotiated for the WUR packet but the PHY transmits the MAC frame at the negotiated transmission rate.

Once the WUR circuitry decodes the receiver address, the MAC logic circuitry 1048 may determine if the receiver address is addressed to the STA 1030. The receiver address may be a MAC address, a WUR address, an association identifier (AID), a broadcast address that identifies a group of receiving devices, or other address. The WUR packet may include a full address, a partial address, or a compressed address (such as a hash of the full or partial address).

FIGS. IC-1F illustrate alternative embodiments of WUR packets 1200, 1300, 1400, and 1500 with WUR preambles 1210, 1310, 1410, and 1510, respectively, for high data rate transmissions such as 250 Kbps. The STA 1010 may implement each of the with WUR preambles 1210, 1310, 1410, and 1510, or one or more of these preambles. Each WUR packet 1200, 1300, 1400, and 1500 comprises an 802.11 preamble, a WUR mark, and a MAC frame. Similar to the discussions with respect to FIG. 1B, the 802.11 preamble as illustrated, comprises a short training field (STF), a long training field (LTF), and a signal field (SIG) but some embodiments may employ more than one STF, more than one LTF, and/or more than one SIG. Furthermore, some embodiments may transmit other 802.11 frames in other resource units of the transmission and may include a legacy preamble similar to that shown as well as a high efficiency (HE) preamble, a high throughput (HT) preamble, a very high throughput (VHT) preamble, a very high efficiency (VHE) preamble, or the like. For packets that are only transmitted to one or more WURxs, the WUR packets 1200, 1300, 1400, and 1500 may only include a legacy 802.11 preamble to communicate a network allocation vector (NAV) to legacy devices and legacy compatible devices in the BSS.

FIG. 1C illustrates a WUR packet 1200 with a WUR preamble 1210. The WUR preamble 1210 may signal a high data rate (HDR) for the WUR data portion. In many embodiments, the WUR preamble 1210 signals an HDR of 250 Kbps for the MAC portion of the WUR packet 1200.

After transmitting the WUR mark, the STA 1010 may transmit the WUR preamble 1210. The STA 1010 may transmit the WUR preamble 1210 with an OOK modulation and, in some embodiments, may apply Manchester coding. To illustrate, some embodiments may transmit the WUR preamble 1210 with one OOK chip transmission during a 1×symbol duration. The chip may represent a (1,0) for a logical one and a (0,1) for a logical zero with Manchester coding. In many embodiments, the STA 1010 may transmit each bit with a two-microsecond pulse. In several embodiments, the STA 1010 may generate the two-microsecond pulse with a 32-bit Fast Fourier Transform (FFT) in a 20 MHz bandwidth with a subcarrier spacing of 625 KHz. The STA 1010 may generate the two-microsecond pulse with a four MHz bandwidth, which involves six subcarriers. This will advantageously save transmit energy over time-domain masking of a four-microsecond pulse and potentially reduce the frequency domain support of the pulse beyond 4 MHz over time-domain masking of a four-microsecond pulse.

In other embodiments, the two-microsecond pulse may be a four-microsecond pulse that is masked. For instance, the STA 1010 may apply a time-domain mask to block half of the four-microsecond pulse to produce the two-microsecond pulse. In such embodiments, the four-microsecond pulse uses a 64-point Fast Fourier Transform (FFT) in a 20 MHz bandwidth with a subcarrier spacing of 312.5 KHz.

The WUR preamble 1210 may comprise a 32-bit bit sequence comprising a zero-bit followed by a first 15-bit PN sequence, a second 15-bit PN sequence, and a zero-bit. The STA 1010 may transmit the WUR preamble 1210 at one bit every two microseconds so the total transmission time for the WUR preamble 1210 may be 64 microseconds. In many embodiments, the preamble sequence, such as the 32-bit sequence, is chosen based on a specific metric such as small sidelobe levels in the auto-correlation function of the sequence or a sequence with a small peak-to-average power ratio (PAPR).

In many embodiments, the first and second 15-bit sequence are two repetitions of the same 15 bit PN sequence. In other embodiments, the 15-bit PN sequences are different. In still other embodiments, the 15-bit sequences are not PN sequences.

After transmitting the WUR preamble 1210, the STA 1010 may transmit the MAC frame. The MAC frame may be any type of WUR frame such as a beacon, a wake-up frame, or the like. In some embodiments, the MAC frame may comprise an action frame such as the WUR frame illustrated in and discussed in conjunction with FIG. 2E.

In several embodiments, the STA 1010 transmits the MAC frame at a different data rate than the WUR preamble 1210. In other embodiments, the STA 1010 transmits the MAC frame at the same data rate as the WUR preamble 1210.

After transmission of the WUR packet 1200, the WUR circuitry 1054 of the PHY of the receiving device, which is the STA 1030 in this embodiment, may detect the preamble, decode the rate of transmission (if capable of multiple rates), and decode the receiver address.

FIG. 1D illustrates a WUR packet 1300 with a WUR preamble 1310. The WUR preamble 1310 may signal a high data rate (HDR) for the WUR data portion. In many embodiments, the WUR preamble 1310 signals a HDR of 250 Kbps for the MAC portion of the WUR packet 1300.

After transmitting the WUR mark, the STA 1010 may transmit the WUR preamble 1310. The STA 1010 may transmit the WUR preamble 1310 with an OOK modulation and, in some embodiments, may apply Manchester coding. To illustrate, some embodiments may transmit the WUR preamble 1310 with one OOK chip transmission during a 1×symbol duration. In many embodiments, the STA 1010 may transmit each bit with a two-microsecond pulse. In several embodiments, the STA 1010 may generate the two-microsecond pulse with a 32-bit Fast Fourier Transform (FFT) in a 20 MHz bandwidth with a subcarrier spacing of 625 KHz. The STA 1010 may generate the two-microsecond pulse with a four MHz bandwidth, which involves six subcarriers.

In other embodiments, the two-microsecond pulse may be a four-microsecond pulse that the STA 1010 masks in the time domain to block half of the pulse to produce the two-microsecond pulse. In such embodiments, the four-microsecond pulse uses a 64-point Fast Fourier Transform (FFT) in a 20 MHz bandwidth with a subcarrier spacing of 312.5 KHz.

The WUR preamble 1310 may comprise a 32-bit bit sequence comprising a zero-bit followed by a 31-bit PN sequence. The STA 1010 may transmit the WUR preamble 1310 at a transmission rate of one bit every two microseconds so the total transmission time for the WUR preamble 1310 may be 64 microseconds. In other embodiments, the 31-bit sequence is not a PN sequence. In many embodiments, the PHY transmits the logical one bit by transmitting the OOK symbol signal for two microseconds and the logical zero bit by not transmitting the OOK symbol signal for two microseconds.

After transmitting the WUR preamble 1310, the STA 1010 may transmit the MAC frame. The MAC frame may be any type of WUR frame such as a beacon, a wake-up frame, or the like. In some embodiments, the MAC frame may comprise an action frame such as the wake-up frame illustrated in and discussed in conjunction with FIG. 2E.

After transmission of the WUR packet 1300, the WUR circuitry 1054 of the PHY of the receiving device, which is the STA 1030 in this embodiment, may detect the preamble, decode the rate of transmission (if capable of multiple rates), and decode the receiver address.

FIG. 1E illustrates a WUR packet 1400 with a WUR preamble 1410. The WUR preamble 1410 may signal a high data rate (HDR) for the WUR data portion. In many embodiments, the WUR preamble 1410 signals a HDR of 250 Kbps for the MAC portion of the WUR packet 1400.

After transmitting the WUR mark, the STA 1010 may transmit the WURp preamble 1410. The STA 1010 may transmit the WUR preamble 1410 with an OOK modulation and, in some embodiments, may apply Manchester coding. To illustrate, some embodiments may transmit the WUR preamble 1410 with one OOK chip transmission during a 1×symbol duration. In many embodiments, the STA 1010 may transmit each bit with a two-microsecond pulse. In several embodiments, the STA 1010 may generate the two-microsecond pulse with a 32-bit Fast Fourier Transform (FFT) in a 20 MHz bandwidth with a subcarrier spacing of 625 KHz. The STA 1010 may generate the two-microsecond pulse with a four MHz bandwidth, which involves six subcarriers.

In other embodiments, the two-microsecond pulse may be a four-microsecond pulse that the STA 1010 masks in the time domain to block half of the pulse to produce the two-microsecond pulse. In such embodiments, the four-microsecond pulse uses a 64-point Fast Fourier Transform (FFT) in a 20 MHz bandwidth with a subcarrier spacing of 312.5 KHz.

The WUR preamble 1410 may comprise a 16-bit bit sequence comprising a zero-bit followed by a 15-bit PN sequence. The STA 1010 may transmit the WUR preamble 1410 at a one bit every two microseconds so the total transmission time for the WUR preamble 1410 may be 32 microseconds. In other embodiments, the 15-bit sequence is not a PN sequence. In many embodiments, the PHY transmits the logical one bit by transmitting the OOK symbol signal for two microseconds and the logical zero bit by not transmitting the OOK symbol signal for two microseconds.

After transmitting the WUR preamble 1410, the STA 1010 may transmit the MAC frame. The MAC frame may be any type of WUR frame such as a beacon, a wake-up frame, or the like. In some embodiments, the MAC frame may comprise an action frame such as the WUR frame illustrated in and discussed in conjunction with FIG. 2E.

In several embodiments, the STA 1010 transmits the MAC frame at a different data rate than the WUR preamble 1410. In other embodiments, the STA 1010 transmits the MAC frame at the same data rate as the WUR preamble 1410.

After transmission of the WUR packet 1400, the WUR circuitry 1054 of the PHY of the receiving device, which is the STA 1030 in this embodiment, may detect the preamble, decode the rate of transmission (if capable of multiple rates), and decode the receiver address.

FIG. 1F illustrates a WUR packet 1500 with a WUR preamble 1510. The WUR preamble 1510 may signal a high data rate (HDR) for the WUR data portion. In many embodiments, the WUR preamble 1510 signals an HDR of 250 Kbps for the MAC portion of the WUR packet 1500.

After transmitting the WUR mark, the STA 1010 may transmit the WUR preamble 1510. The STA 1010 may transmit the WUR preamble 1510 with an OOK modulation and, in some embodiments, may apply Manchester coding. To illustrate, some embodiments may transmit the WUR preamble 1510 with one OOK symbol transmission during a 1×symbol duration for OFDM. In many embodiments, the STA 1010 may transmit each bit of the WUR preamble 1510 with a four-microsecond pulse. In several embodiments, the STA 1010 may generate the four-microsecond pulse with a 64-bit Fast Fourier Transform (FFT) in a 20 MHz bandwidth with a subcarrier spacing of 312.5 KHz. The STA 1010 may generate the four-microsecond pulse with a four MHz bandwidth, which involves 13 subcarriers.

In many embodiments, the STA 1010 transmits a bit of the WUR preamble 1510 every four-microseconds. The STA 1010 may transmit the data portion of the WUR packet 1500, which may be the MAC frame, at 250 Kbps. In many embodiments, the PHY transmits the logical one bit of the WUR preamble 1510 of the WUR packet 1500 by transmitting the OOK symbol signal for 4 microseconds and the logical zero bit by not transmitting the OOK symbol signal for 4 microseconds.

The WUR preamble 1510 may comprise a 16-bit bit sequence comprising a zero-bit followed by a 15-bit PN sequence. The STA 1010 may transmit the WUR preamble 1510 at a transmission rate of one bit every four microseconds so the total transmission time for the WUR preamble 1510 may be 64 microseconds. In other embodiments, the 15-bit sequence is not a PN sequence.

After transmitting the WUR preamble 1510, the STA 1010 may transmit the MAC frame. The MAC frame may be any type of WUR frame such as a beacon, a wake-up frame, or the like. In some embodiments, the MAC frame may comprise an action frame such as the wake-up frame illustrated in and discussed in conjunction with FIG. 2E.

In several embodiments, the STA 1010 transmits the MAC frame at a higher data rate than the WUR preamble 1510. For instance, the STA 1010 may transmit the MAC frame at 250 Kbps in this embodiment. In other embodiments, the STA 1010 transmits the MAC frame at the same data rate or a lower data rate than the WUR preamble 1510.

After transmission of the WUR packet 1500, the WUR circuitry 1054 of the PHY of the receiving device, which is the STA 1030 in this embodiment, may detect the preamble, decode the rate of transmission (if capable of multiple rates), and decode the receiver address.

FIG. 1G illustrates an embodiment of a wake-up receiver (WURx) front end 1600 for WUR circuitry such as the WUR circuitry 1054 illustrated in FIG. 1A. The WURx front end 1600 may comprise logic circuitry to correlate and analyze an incoming WUR preamble. The logic circuitry may comprise circuitry to perform the correlation and analysis or may comprise a combination of circuitry and logic circuitry such as a state machine, a specific purpose processor, a processor and code, or the like. The correlator 1610 may receive an incoming signal that includes a WUR preamble 1110, 1310, 1410, or 1510.

The correlator 1610 may also receive or otherwise comprise a common preamble sequence for low data rate (LDR) signals and high data rate (HDR) signals such as a 32-bit sequence for correlating against the incoming signal. In some embodiments, the correlator 1610 may continually compare bits of an incoming signal until a portion of the signal matches the common preamble sequence.

In some embodiments, the common preamble sequence input is a series of repeated common preamble sequences such as 15-bit sequences or 31-bit sequences. In this embodiment, the common preamble sequence input is a zero-bit followed by a 15-bit PN sequence followed by the 15-bit PN sequence again and followed by a final zero-bit. The 15-bit PN sequence is included in both a WUR preamble 1110 that signals an LDR for the data portion of a WUR packet and a wake-up preamble 1410 or 1510 that signals an HDR for the data portion of a WUR packet. For the purposes of this example, the LDR wake-up radio preamble is the WUR preamble 1110 and the HDR wake-up radio preamble is the WUR preamble 1410 or 1510. Also, for the purposes of this example, the 15-bit pn sequences in each of these WUR preambles 1110, 1410, and 1510 are the same sequence.

In this embodiment, the WURx front end 1600 can distinguish between the LDR preamble 1110 and the HDR preamble 1410 or 1510 by correlating the incoming WUR preamble against the common preamble sequence. In some embodiments, the WURx front end 1600 may include more than one correlator such as the correlator 1610. The correlator 1610 may compare the incoming WUR preamble against multiple common preamble sequences. One or more analyzers 1620 may determine the rate associated with the incoming WUR preamble based on the output of the correlators such as the correlator 1610.

The correlator 1610 may output peak correlations that have a peak value based on how closely a portion of the incoming signal matches the common preamble. If the incoming signal is the WUR preamble 1110, as the preamble is correlated, the correlator 1610 may correlate portions of the incoming signal that are the same length as the common preamble sequence input. So as the incoming signal begins to enter the correlator 1610, the correlator 1610 will detect a first peak value when the first 15-bit sequence of the wake-up preamble 1110 is received. This first peak value will be based on the correlation of the one 15-bit PN sequence against the two repetitions of the 15-bit PN sequence in the common preamble sequence input. The second peak value will be larger due to the higher correlation of both 15-bit PN sequences in the incoming signal against both 15-bit PN sequences in the common preamble input. A third peak value will result from a correlation of the second 15-bit PN sequence and a portion of the MAC frame against the common preamble sequence input.

The analyzer 1620 may receive the peak values and determine that the incoming signal is the LDR preamble sequence 1110 because the peak value followed by a large peak value followed by another peak value is characteristic of the LDR WUR preamble 1110. The analyzer 1620 may output an indication of the LDR to a portion of the WURx front end 1600 to capture the MAC frame of the WUR packet at the LDR of, e.g. 62.5 Kbps.

To further illustrate, the incoming signal may be a WUR preamble that signals a high data rate (HDR) for the MAC frame portion of the WUR packet such as the WUR preambles 1410 or 1510. The correlator 1610 may compare the incoming signal, the WUR preamble 1410 or 1510, against the common preamble sequence input that is the zero-bit followed by a 15-bit PN sequence, followed by another repetition of the 15-bit PN sequence, and followed by another zero-bit. The correlator 1610 may detect a first peak value when the 15-bit PN sequence of the incoming signal is compared against the first 15-bit PN sequence of the common preamble sequence input and may detect a second peak value that is approximately the same as the first peak value when part of the MAC frame and the 15-bit PN sequence of the incoming signal is compared against the common preamble sequence input.

The correlator 1610 may output the two peak values to the analyzer 1620 and the analyzer 1620 may determine that the incoming signal is an HDR preamble such as the WUR preamble 1410 or 1510 based on the magnitude of the two peak values and the timing between receipt of the two peak values. Thereafter, the analyzer 1620 may output an indication that the data rate for the incoming MAC frame of the WUR packet is the HDR such as 250 Kbps so that the WURx can adjust the capture rate of samples from the incoming signal to detect bits in the incoming signal.

The WUR of each communications device may have a unique address. In some embodiments, the address of the WUR differs from the address assigned to main radio of the communications device, such as the MAC address or AID of an IEEE 802.11ax main radio. In other embodiments, the addresses of the main radio and the WUR is the same.

One challenge with multi-user transmission comprising a WUR packet along with IEEE 802.11ax packets is blocking the adjacent interference to WUR, which may be an inexpensive and low power consuming device. Also, the interference from WUR to the IEEE 802.11ax receiver should not cause any degradation in 802.11ax performance.

Some embodiments may populate 802.11ax OFDMA subcarriers of 4×Symbol duration to generate a WUR packet. By doing so, due to orthogonality of subcarriers, the WUR packet may not cause any interference to 802.11ax. Embodiments may also or alternatively leave adjacent resource units (RUs) blank, or without a data signal to reduce the interference from 802.11ax to the WUR. Note that using 802.11ax OFDMA numerology with 4×Symbol duration will generate lower data rate transmission for a WUR packet. As a result, many embodiments may also comprise an embedded encoder to avoid reducing the data rate to ¼th of 1×Sym duration.

FIG. 1H illustrates embodiments of WUR preambles 1700 and 1710 to distinguish a low data rate (LDR) and a high data rate (HDR), respectively. In this embodiment, the channel bandwidth is 20 megahertz (MHz) and the WUR packet transmission is on a 4 MHz sub-band of the 20 MHz channel. The WUR preamble 1700 to signal the LDR may transmit with a duration of 128 microseconds and may have twice the number of bits (twice the bit count or twice the length in bits) as the WUR preamble 1710 to signal the HDR. The WUR preamble 1710 to signal the HDR may transmit with a duration of 64 microseconds and may have half the number of bits (half the bit count or half the length in bits) as the WUR preamble 1700 to signal the LDR.

The STAs 1010 and 1030 comprise processor(s) 1001 and 1031, and memory 1011, and 1041, respectively. The processor(s) 1001 and 1031 may comprise any data processing device such as a microprocessor, a microcontroller, a state machine, and/or the like, and may execute instructions or code in the memory 1011 and 1041. The memory 1011 and 1041 may comprise a storage medium such as Dynamic Random-Access Memory (DRAM), read only memory (ROM), buffers, registers, cache, flash memory, hard disk drives, solid-state drives, or the like. The memory 1011 and 1041 may store the frames, frame structures, frame headers, or the like, and may also comprise code WUR logic.

A timestamp is a value from a timing synchronization function (TSF) timer in an AP such as the STA 1010 that the AP uses to synchronize the stations associated with the BSS and in the STA 1030 so that the STA 1030 can synchronize its TSF timer 1035 with that of the AP while associated with the AP to synchronize communications. The TSF timer, such as TSF timers 1005 and 1035 in FIG. 1A, may reside in a chipset of the station such as STAs 1010 and 1030, in some embodiments, and may reside elsewhere in the station in other embodiments.

The AP may transmit the beacon frame periodically and capture the value in the timing synchronization function (TSF) timer at the time of, concurrent with, or contemporaneous with, transmission to include in a frame body of the beacon frame as the timestamp. A station, such as the STA 1030 in FIG. 1A, receives the beacon frame via the primary connectivity radio (PCR) such as the wireless network interface 1052 and corrects the TSF timer 1035 for the station 1030. The correction of the TSF timer for the station 1030 synchronizes the station with the BSS by updating the value in the TSF timer 1035.

The MAC logic circuitry 1018 and 1048 may comprise one or more circuits to implement MAC layer functionality and management service interfaces through which MAC layer management functions may be invoked. The MAC logic circuitry 1018 and 1048 may comprise one or more processors to execute MAC layer code stored in the memory 1011 and 1041, respectively. In other embodiments, the MAC logic circuitry 1018 and 1048 may comprise interface circuitry to execute code on the one or more processors 1001 and 1031, respectively.

The MAC logic circuitry 1018 and 1048 may communicate with the physical layer (PHY) logic circuitry of wireless network interfaces 1022 and 1052, respectively, to transmit a PHY frame such as a channel sounding packet or may provide a MAC frame such as a management frame to the PHY logic circuitry to transmit to the STA 1030 and the STA 1010, respectively. The MAC logic circuitry 1018 and 1048 may generate frames such as management, data, and control frames.

The PHY logic circuitry of wireless network interfaces 1022 and 1052 may prepare the MAC frame for transmission by, e.g., determining a preamble to prepend to a MAC frame to create a PHY frame. The preamble may include one or more short training field (STF) values, long training field (LTF) values, and signal (SIG) field values. The wireless network interfaces 1022 and 1052 may be PHY layer devices including a transmitter and a receiver and the transmitter may process the PHY frame to transmit.

After processing the PHY frame, radios 1026 and 1056, each comprising an RF transmitter and an RF receiver, may impress digital data onto subcarriers of RF frequencies for transmission by electromagnetic radiation via elements of an antenna array or antennas 1028 and 1058, respectively. The RF receiver receives electromagnetic energy, extracts the digital data, and decodes the frame.

FIGS. 2A-2C illustrate embodiments of channels and subchannels (or resource units) that can facilitate multiple transmissions simultaneously along with transmission of a WUR PPDU. FIG. 2A illustrates an embodiment of transmissions 2010 between four stations and an AP on four different subchannels (or resource units) of a channel via OFDMA. Grouping subcarriers into groups of resource units is referred to as subchannelization. Subchannelization defines subchannels that can be allocated to stations depending on their channel conditions and service requirements. An OFDMA system may also allocate different transmit powers to different subchannels.

In the present embodiment, the OFDMA STA1, OFDMA STA2, OFDMA STA3, and OFDMA STA4 may represent transmissions on a four different subchannels of the channel. For instance, transmissions 2010 may represent an 80 MHz channel with four 20 MHz bandwidth WUR PPDUs using frequency division multiple access (FDMA). Such embodiments may include, e.g., 1 WUR packet per 20 MHz bandwidth WUR PPDU, 2 WUR packets in a 40 MHz bandwidth PPDU, and 4 WUR packets in an 80 MHz bandwidth WUR PPDU. As a comparison, FIG. 2B illustrates an embodiment of an orthogonal frequency division multiplexing (OFDM) transmission 2015 for the same channel as FIG. 2A. The OFDM transmission 2015 may use the entire channel bandwidth.

FIG. 2C illustrates an embodiment of a 20 Megahertz (MHz) bandwidth 2020 on a channel that illustrates different resource unit (RU) configurations 2022, 2024, 2026, and 2028. In OFDMA, for instance, an OFDM symbol is constructed of subcarriers, the number of which is a function of the physical layer protocol data unit (PPDU) (also referred to as the PHY frame) bandwidth. There are several subcarrier types: 1) Data subcarriers which are used for data transmission; 2) Pilot subcarriers which are utilized for phase information and parameter tracking; and 3) unused subcarriers which are not used for data/pilot transmission. The unused subcarriers are the direct current (DC) subcarrier, the Guard band subcarriers at the band edges, and the Null subcarriers.

The RU configuration 2022 illustrates an embodiment of nine RUs that each include 26 subcarriers for data transmission including the two sets 13 subcarriers on either side of the DC. The RU configuration 2024 illustrates the same bandwidth divided into 5 RUs including four RUs with 52 subcarriers and one RU with 26 subcarriers about the DC for data transmission. The RU configuration 2026 illustrates the same bandwidth divided into 3 RUs including two RUs with 106 subcarriers and one RU with 26 subcarriers about the DC for data transmission. And the RU configuration 2028 illustrates the same bandwidth divided into 2 RUs including two RUs with 242 subcarriers about the DC for data transmission. Embodiments may be capable of additional or alternative bandwidths such as such as 40 MHz, 80 MHz, 160 MHz and 80+80 MHz.

FIG. 2D illustrates an embodiment of a WUR PPDU in the form of an 802.11, multi-user, orthogonal frequency division multiple access (OFDMA) packet that is capable of multiple transmissions on different RUs of a 20 MHz channel. In some embodiments, the WUR circuitry may transmit a WUP on a sub-band of the WUR PPDU transmission without transmitting packets in other sub-bands of the channel. The basic idea is shown by the example given in FIG. 2D, where the PHY transmits the WUR packet at the center of the band in a multi-user OFDMA transmission that multiplexes, e.g., IEEE 802.11ax transmissions in frequency within the same multi-user OFDMA packet. In other words, the PHY transmits multiple different packets on different resource units or frequency sub-bands within the channel simultaneously.

Many embodiments transmit a WUR preamble of the WUR PPDU to synchronize with a WUR of another device. In some embodiments, the WUR preamble may signal a transmission rate for a medium access control (MAC) layer packet that follows the WUR preamble. Other embodiments may only be capable of receiving the WUR packet at one rate.

After transmission of the WUR packet, the WUR circuitry of the PHY of the receiving device may decode the receiver address. Once the WUR circuitry decodes the receiver address, the MAC layer circuitry may determine if the receiver address is addressed to the WUR circuitry. The receiver address may be a MAC address, a WUR address, an association identifier (AID), a broadcast address that identifies a group of receiving devices, or other address. The WUR packet may include a full address, a partial address, or a compressed address (such as a hash of the full or partial address).

The WUR of each communications device may have a unique address. In some embodiments, the address of the WUR differs from the address assigned to main radio (PCR) of the communications device, such as the MAC address or AID of an IEEE 802.11ax main radio (PCR). In other embodiments, the addresses of the PCR and the WUR are the same.

The FIG. 2E illustrates an embodiment of a WUR PPDU 2300. FIG. 2E illustrates a single STF field, LTF field, and SIG field. These field represent an IEEE 802.11 preamble 2310 such as a legacy IEEE 802.11ah preamble. After the 802.11 preamble, the WUR PPDU 2300 may comprise a WUR mark 2312. For IEEE 802.11ax, the 8023.11 preamble 2310 may include a legacy IEEE 802.11 preamble followed by a high efficiency (HE) preamble.

After the 802.11 preamble 2310 and, in some embodiments, a WUR mark 2312, which may be transmitted across the entire bandwidth of the channel, the WUR PPDU 2300 may comprise a WUR packet 2330. The WUR packet 2330 may comprise a WUR preamble 2314, a MAC header 2316, a payload 2318, and a frame check sequence (FCS) 2320 field. The WUR preamble 2314 may include a series of 32 bits. In some embodiments, the WUR preamble 2314 may include one or more repetitions of a sequence. In some embodiments, the WUR preamble 2314 may include more or less bits in the sequence and, in some embodiments, the WUR preamble 2314 may include different sequences of bits in the WUR preamble 2314.

Alternative embodiments include a rate field in the WUR preamble 2314 or immediately following the WUR preamble 2314. The receiver address may follow the rate field, in some embodiments, to facilitate transmission of the receiver address at a different rate than the rate of transmission of the wake-up preamble.

The MAC header 2316 may include a receiver address that may comprise a receiver identifier (ID) such as a partial MAC address. In some embodiments, the MAC header may include more fields.

The payload 2318 may include an action identifier (ID) and an action payload. The action ID may identify the structure of the action payload and the action payload may include an instruction to wake a PCR such as an IEEE 802.11ax radio either immediately or after a period of time. In some embodiments, the period of time may identify a target wake time for the PCR to be ready to receive a packet.

The WUR may implement two or more different packet and/or preamble formats for WUR packets such as one for a higher data rate, e.g., of 250 Kbps using 1×Sym duration as in 802.11n/11 ac and one for a lower data rate, e.g., of 62.5 Kbps using 4×Sym duration of 802.11ax. In some embodiments, the WUR may also implement different packet and/or WUR preamble formats for multiple lower data rates.

Although inclusion of more than one preamble formats appears to add a bit more complexity to the design, it is argued that, advantageously, there is no increase in the AP nor the WUR design to add more than one preamble formats to signal different data rates. In the case of the AP, 802.11ax already requires two symbol durations to be supported. And in the WUR, the receiver may use a simple correlator as a detector, so changing the symbol time may only increase the integration time of the receiver.

An advantage of such embodiments is that spectrum utilization can be improved when low data rate is used because an access point (AP) can transmit a WUR packet along with 802.11ax packets simultaneously using OFDMA.

Transmission at the AP may involve utilization of one or more of transmission rates of the WUR packet. Reception at WUR devices may involve a WUR device that is unaware whether the packet is a multi-user (e.g., multiplexed with 802.11ax) or a single user transmission. The WUR receiver may search for preamble sequences and/or a signal field (also referred to as a rate field) to detect the start of the WUR packet and to identify its transmission rate. The rate is either detected through the use of different preamble sequences and/or through decoding of the signal field, or rate field, that carries the rate information.

A WUR capable STA and AP may exchange the capability for supported rate and format and negotiate the supported rates (for embodiments in which the support of one or more rate is optional) and/or subchannel (or tone or subband or RU(s)) location within the channel via PCR when setting up the WUR operation. The above indications such as the supported rates and the subchannel can be in WUR capability element such as the WUR capability element 2500 illustrated in FIG. 1G along with, e.g., a symbol duration or pulse 2510. In some embodiments, the WUR capability element 2500 illustrated in FIG. 2G may be included in a frame such as the management frame 2400 illustrated in FIG. 2F. In such embodiments, the WUR capability element 2500 may be in the frame body 2434 of the management frame 2400.

Embodiments may define two or three or more different packet structures for one or more HDR and one or more LDR WUR packets. To enable better spectrum efficiency, some embodiments include LDR transmissions within in, e.g., 802.11ax multi-user OFDMA packets, to allow concurrent transmission of 802.11 packets with a WUR packet. The multi-user transmission may occupy more bandwidth than 4 MHz, which in turn overcomes the regulatory specified Tx-PSD limit (Power Spectral Density limit), and hence the AP can transmit at higher Tx-power (transmission power).

Many embodiments may provide a wireless connectivity solution for mobile/wearable devices that can minimize power consumption.

FIG. 2F depicts an embodiment of a frame 2400 such as an association or reassociation frame. The frame 2400 is one embodiment of a frame that can transmit the WUR capability element 2500 with an indication of a WUR capability 2510 illustrated in FIG. 2G. The choice of fields for communicating information may be application specific. In other embodiments, for example, the frame 2400 may have more or less fields, different fields, and/or fields with different field lengths.

The frame 2400 may comprise a MAC header with a frame control field 2410, a duration field 2430, address(es) field(s) 2432, a sequence control field 2433, a frame body 2434, and a frame check sequence (FCS) field 2436. The frame control field 2410 may comprise a protocol version field 2412, a type field 2414, a subtype field 2416, and other frame control bits 2418. The protocol version field 2412 may represent the revision of the corresponding standard that the frame represents. The type field 2414 may identify the type of frame 2414 as, e.g., a control frame. The subtype field 2416 may identify the subtype of the frame as, e.g., a particular type of control frame such as an association frame. The other frame control bits 2418 may represent additional fields that may be present in the frame control field such as a more fragments field, a retry field, a power management field, a more data field, or the like.

The duration field 2430 may include a duration of a network allocation vector (NAV) reminder in microseconds. The ADDR(s) field(s) 2432 may include a broadcast address to broadcast to each station associated with the STA 1010 or an address of a specific STA. The ADDR(s) field(s) 2432 may include a full or partial address such as a MAC address of a STA.

Figure 3:
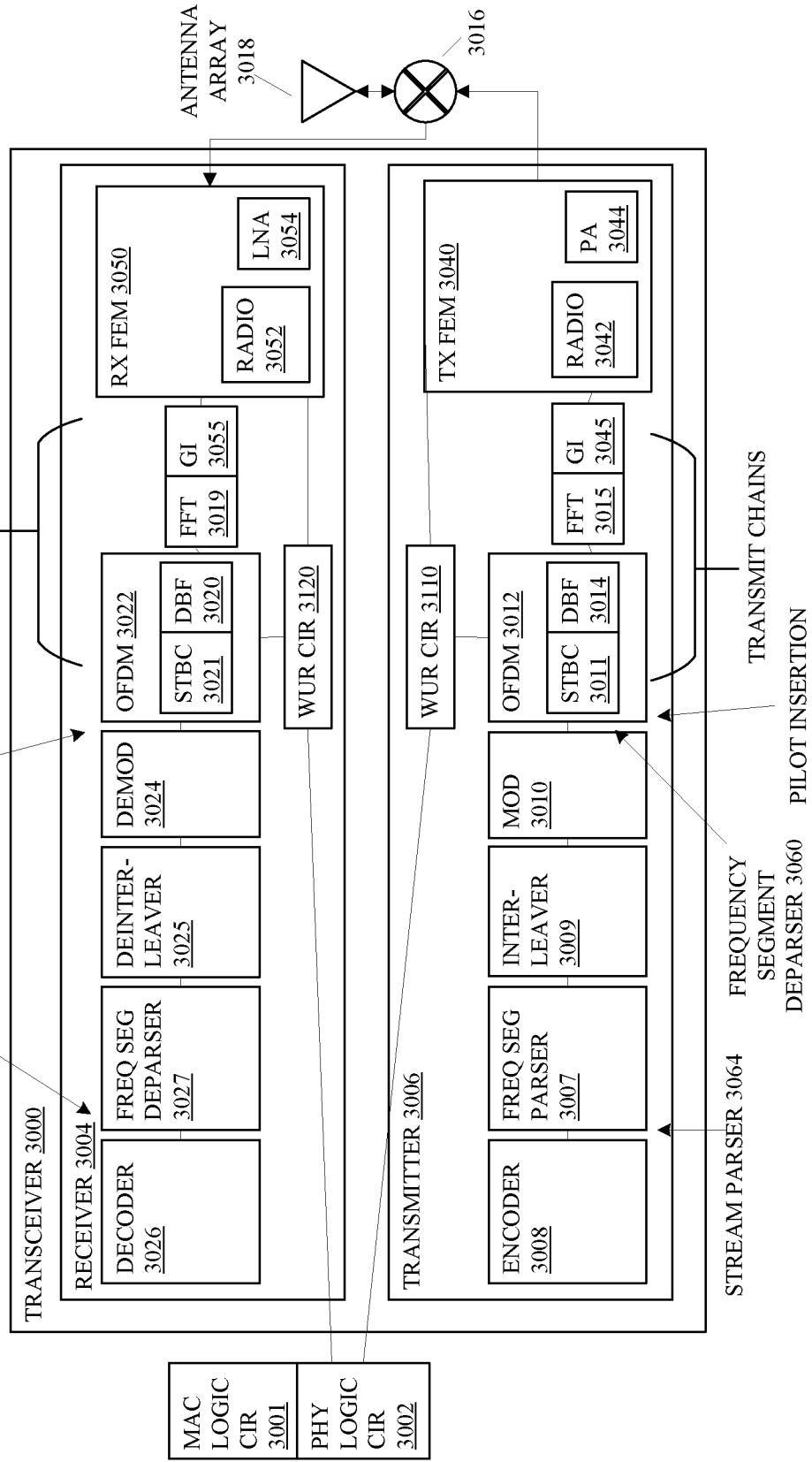
FIG. 3 depicts an embodiment of an apparatus to support compatible low rate for wake-up radio packet transmission.

FIG. 3 depicts an embodiment of an apparatus to generate, transmit, receive, and interpret or decode PHY frames and MAC frames with a WUR packet to support compatible low rate for wake-up radio packet transmission. The apparatus comprises a transceiver 3000 coupled with MAC logic circuitry 3001 and PHY logic circuitry 3002. The MAC logic circuitry 3001 and PHY logic circuitry 3002 may comprise code executing on processing circuitry of a baseband processor and/or other processor; circuitry to implement operations of functionality of the MAC or PHY; or a combination of both. The MAC logic circuitry 3001 may determine a frame such as a WUR frame and the PHY logic circuitry 3002 may determine the physical layer protocol data unit (PPDU) by prepending the frame or multiple frames, also called MAC protocol data units (MPDUs), with a preamble to transmit.

The transceiver 3000 comprises a receiver 3004 and a transmitter 3006. Embodiments have many different combinations of modules to process data because the configurations are deployment specific. FIG. 3 illustrates some of the modules that are common to many embodiments.

In the present embodiment, the transceiver 3000 includes WUR circuitry 3110 and 3120 such as the WUR circuitry 1024 and 1054, respectively, shown in FIG. 1A. The WUR circuitry 3110 may comprise circuitry to use portions of the transmitter 3006 (a transmitter of the PCR) to generate a WUR packet. For instance, the WUR circuitry 3110 may generate an OOK signal with OFDM symbols to generate a WUR packet for transmission via the antenna array 3018.

Note that a station such as the STA 1010 in FIG. 1A may comprise multiple transmitters to facilitate concurrent transmissions on multiple contiguous and/or non-contiguous carrier frequencies and WUR circuitry 3110 may couple with more than one of the transmitters or more than one of the transmitters may comprise instances of WUR circuitry to facilitate simultaneous WUR packet transmissions in one or multiple 802.11 packets (WUR PPDUs) on channels with bandwidths such as 40 MHz, 80 MHz, and 160 MHz. In other embodiments, the WUR may comprise an independent circuitry that does not use portions of the transmitter 3006.

The WUR circuitry 3120 may comprise circuitry to use portions of the receiver 3004 while in a WUR mode with the PCR is in a power save mode and the wake-up radio is in a WURx active mode or a WURx inactive mode. The WUR circuitry 3120 may comprise circuitry to use portions of the receiver 3004 (a receiver of the PCR) to receive a WUR packet in the form of OFDM OOK symbols while the remainder of the receiver 3004 (the PCR) is in a power save mode. For instance, the WUR circuitry 3120 may comprise one or more correlators such as the correlator 1610 in FIG. 1G and one or more analyzers such as the analyzer 1620 in FIG. 1G.

The transmitter 3006 may comprise one or more of an encoder 3008, a stream deparser 3066, a frequency segment parser 3007, an interleaver 3009, a modulator 3010, a frequency segment deparser 3060, an OFDM 3012, an Inverse Fast Fourier Transform (IFFT) module 3015, a GI module 3045, and a transmitter front end 3040. The encoder 3008 of transmitter 3006 receives and encodes a data stream destined for transmission from the MAC logic circuitry 3001 with, e.g., a binary convolutional coding (BCC), a low-density parity check coding (LDPC), and/or the like. After coding, scrambling, puncturing and post-FEC (forward error correction) padding, a stream parser 3064 may optionally divide the data bit streams at the output of the FEC encoder into groups of bits. The frequency segment parser 3007 may receive data stream from encoder 3008 or streams from the stream parser 3064 and optionally parse each data stream into two or more frequency segments to build a contiguous or non-contiguous bandwidth based upon smaller bandwidth frequency segments. The interleaver 3009 may interleave rows and columns of bits to prevent long sequences of adjacent noisy bits from entering a BCC decoder of a receiver.

The modulator 3010 may receive the data stream from interleaver 3009 and may impress the received data blocks onto a sinusoid of a selected frequency for each stream via, e.g., mapping the data blocks into a corresponding set of discrete amplitudes of the sinusoid, or a set of discrete phases of the sinusoid, or a set of discrete frequency shifts relative to the frequency of the sinusoid. In some embodiments, the output of modulator 3010 may optionally be fed into the frequency segment deparser 3060 to combine frequency segments in a single, contiguous frequency bandwidth of, e.g., 160 MHz. Other embodiments may continue to process the frequency segments as separate data streams for, e.g. a non-contiguous 80+80 MHz bandwidth transmission.

After the modulator 3010, the data stream(s) are fed to an OFDM 3012. The OFDM 3012 may comprise a space-time block coding (STBC) module 3011, and a digital beamforming (DBF) module 3014. The STBC module 3011 may receive constellation points from the modulator 3010 corresponding to one or more spatial streams and may spread the spatial streams to a greater number of space-time streams. Further embodiments may omit the STBC.

The OFDM 3012 impresses or maps the modulated data formed as OFDM symbols onto a plurality of orthogonal subcarriers so the OFDM symbols are encoded with the subcarriers or tones. The OFDM symbols may be fed to the DBF module 3014. Generally, digital beam forming uses digital signal processing algorithms that operate on the signals received by, and transmitted from, an array of antenna elements. Transmit beamforming processes the channel state to compute a steering matrix that is applied to the transmitted signal to optimize reception at one or more receivers. This is achieved by combining elements in a phased antenna array in such a way that signals at particular angles experience constructive interference while others experience destructive interference.

The IFFT module 3015 may perform an inverse discrete Fourier transform (IDFT) on the OFDM symbols to map on the subcarriers. The guard interval (GI) module 3045 may insert guard intervals by prepending to the symbol a circular extension of itself. The GI module 3045 may also comprise windowing to optionally smooth the edges of each symbol to increase spectral decay.

The output of the GI module 3045 may enter the transmitter front end module (TX FEM) 3040. The transmitter front end 3040 may comprise a radio 3042 with a power amplifier (PA) 3044 to amplify the signal and prepare the signal for transmission via the antenna array 3018. In many embodiments, entrance into a spatial reuse mode by a communications device such as a station or AP may reduce the amplification by the PA 3044 to reduce channel interference caused by transmissions.

The transceiver 3000 may also comprise duplexers 3016 connected to antenna array 3018. The antenna array 3018 radiates the information bearing signals into a time-varying, spatial distribution of electromagnetic energy that can be received by an antenna of a receiver. In several embodiments, the receiver 3004 and the transmitter 3006 may each comprise its own antenna(s) or antenna array(s).

The transceiver 3000 may comprise a receiver 3004 for receiving, demodulating, and decoding information bearing communication signals. The receiver 3004 may comprise a receiver front-end module (RX FEM) 3050 to detect the signal, detect the start of the packet, remove the carrier frequency, and amplify the subcarriers via a radio 3052 with a low noise amplifier (LNA) 3054. The RX FEM 3050 may couple with the WUR circuitry 3120 to detect low data rate (LDR) and/or high data rate (HDR) WUR preambles of WUR packets such as the WUR packets shown in FIGS.

1B-1F and 1H. In several embodiments, the WUR circuitry 3120 or the RX FEM 3050 may include one or more correlators and analyzers such as the correlator 1610 and the analyzer 1620 shown in FIG. 1G for detection and identification of an LDR WUR preamble or an HDR WUR preamble.

The receiver 3004 may comprise a GI module 3055 and a fast Fourier transform (FFT) module 3019. The GI module 3055 may remove the guard intervals and the windowing and the FFT module 3019 may transform the communication signals from the time domain to the frequency domain.

The receiver 3004 may also comprise an OFDM 3022, a frequency segment parser 3062, a demodulator 3024, a deinterleaver 3025, a frequency segment deparser 3027, a stream deparser 3066, and a decoder 3026. An equalizer may output the weighted data signals for the OFDM packet to the OFDM 3022. The OFDM 3022 extracts signal information as OFDM symbols from the plurality of subcarriers onto which information-bearing communication signals are modulated.

The OFDM 3022 may comprise a DBF module 3020, and an STBC module 3021. The received signals are fed from the equalizer to the DBF module 3020. The DBF module 3020 may comprise algorithms to process the received signals as a directional transmission directed toward to the receiver 3004. And the STBC module 3021 may transform the data streams from the space-time streams to spatial streams.

The output of the STBC module 3021 may enter a frequency segment parser 3062 if the communication signal is received as a single, contiguous bandwidth signal to parse the signal into, e.g., two or more frequency segments for demodulation and deinterleaving.

The demodulator 3024 demodulates the spatial streams. Demodulation is the process of extracting data from the spatial streams to produce demodulated spatial streams. The deinterleaver 3025 may deinterleave the sequence of bits of information. The frequency segment deparser 3027 may optionally deparse frequency segments as received if received as separate frequency segment signals or may deparse the frequency segments determined by the optional frequency segment parser 3062. The decoder 3026 decodes the data from the demodulator 3024 and transmits the decoded information, the MPDU, to the MAC logic circuitry 3001.

The MAC logic circuitry 3001 may parse the MPDU based upon a format defined in the communications device for a frame to determine the particular type of frame by determining the type value and the subtype value. The MAC logic circuitry 3001 may then interpret the remainder of MPDU.

While the description of FIG. 3 focuses on a single spatial stream system for simplicity, many embodiments are capable of multiple spatial stream transmissions and use parallel data processing paths for multiple spatial streams from the PHY logic circuitry 3002 through to transmission. Further embodiments may include the use of multiple encoders to afford implementation flexibility.

FIGS. 4A-B depict embodiments of flowcharts 4000 and 4100 to transmit communications with a frame. Referring to FIG. 4A, the flowchart 4000 may begin with a wireless network interface of a communications device such as the STAs 1010 and 1030 in FIG. 1A, generating an 802.11 preamble for transmission on a channel (element 4010) such as a high-efficiency preamble shown in FIG. 2D or the legacy 802.11 preamble shown in FIG. 2E. The legacy 802.11 preambles may include, for instance, 802.11a preambles, 802.11n preambles, 802.11ac preambles, and/or other older standard preambles.

A MAC layer logic circuitry of the wireless network interface may generate a MAC frame as a wake-up radio (WUR) packet to transmit to other devices of a network, including a wake-up radio preamble (element 4015) and a frame body. The frame body may include, e.g., a receiver address and a frame body and the MAC layer logic circuitry may pass the MAC frame as an MAC protocol data unit (MPDU) to a PHY logic circuitry of the wireless network interface. The MAC frame may comprise a wake-up packet (WUP) to wake a PCR of a WURx. The PHY logic circuitry may transform or convert the data into a packet of on-off keying (OOK) orthogonal frequency division multiplexing (OFDM) symbols that can be transmitted to a STA after transmission of the 802.11 preamble.

The wireless network interface may transmit a wake-up radio preamble on a sub-band of the channel after transmission of the 802.11 preamble as OOK symbols in the time domain and may transmit the remainder of the WUR packet after transmission of the wake-up radio preamble as one or more OOK symbols at a rate indicated by the WUR preamble for transmission on the sub-band (element 4020). For example, a PHY device of the wireless network interface may pass OOK symbols to the radio and antenna array for transmission.

Referring to FIG. 4B, the flowchart 4100 begins with a PCR of a device such as the PCR 1016 in FIG. 1A generating and transmitting, via an antenna array, an 802.11 preamble for a WUR physical layer data unit (PPDU) on a channel (element 4110) with a bandwidth or, e.g., 20 MHz. The PCR may generate a remainder of a 802.11 (PPDU) for a 2 MHz subchannel of the channel as well as a wake-up radio (WUR) packet for a 4 MHz subchannel of the channel concurrently. After transmission of the 802.11 preamble for the WUR PPDU, the PCR may transmit, via an antenna array, the remainder of a 802.11 (PPDU) for the 2 MHz subchannel of the channel as well as the WUR packet for a 4 MHz subchannel of the channel concurrently (element 4115). For example, the PCR may transmit the remainder of the 802.11 PPDU on a first sub-band of the channel at a high-efficiency transmission rate and WUR circuitry may concurrently transmit the WUR packet with a MAC frame.

Referring to FIG. 4C, the flowchart 4250 begins with a wake-up radio logic circuitry of a wake-up radio receiver, such as the WUR logic circuitry 1050 and WUR circuitry 1054 in FIG. 1A, receiving and decoding, via an antenna array, a wake-up radio preamble for a wake-up radio frame on one of the sub-channels of a channel (element 4252). The wake-up radio logic circuitry may decode the preamble to determine the rate of the transmission for the wake-up radio frame (element 4254).

After identifying the transmission rate from the wake-up radio preamble, the WUR logic circuitry may receive the MAC frame from the PHY based on the data transmission rate (element 4256).

Figure 4E:
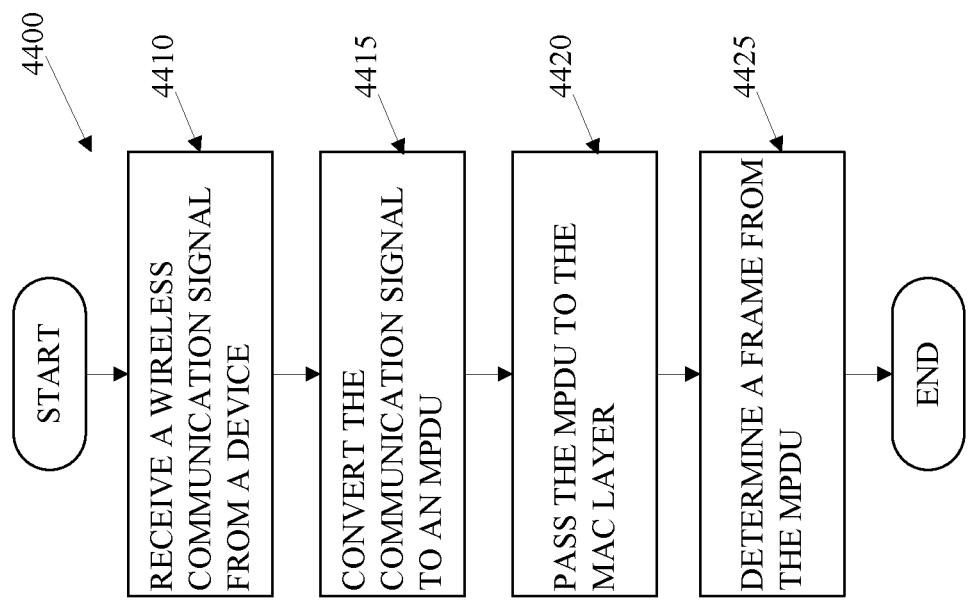
FIGS. 4D-E depict embodiments of flowcharts to transmit and receive frames for communications between wireless communication devices.
Figure 4D:
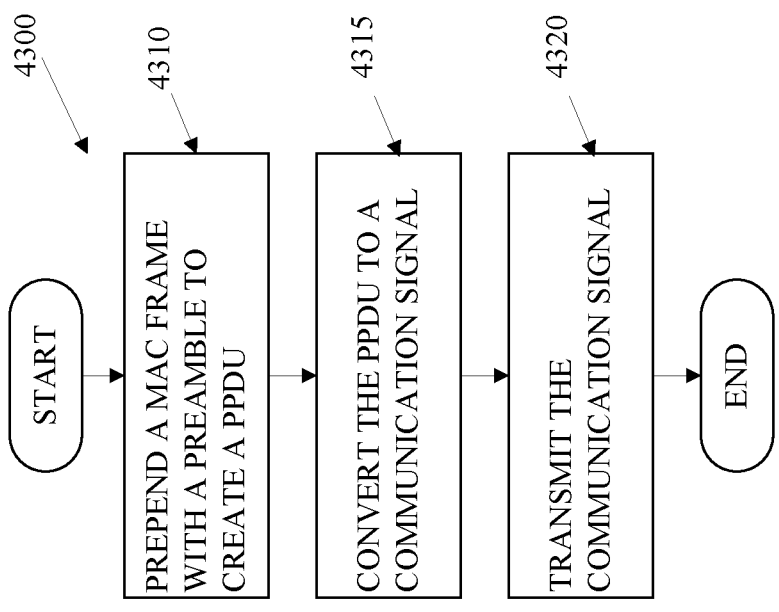

FIGS. 4D-E depict embodiments of flowcharts 4300 and 4400 to transmit, receive, and interpret communications with a frame. Referring to FIG. 4D, the flowchart 4300 may begin with receiving a WUR frame from the PCR 1080 (or the WUR circuitry 1024) of the STA 1010 by the PCR 1046 (or the WUR circuitry 1054) of the STA 1030. The MAC layer logic circuitry of the STA 1030 may generate a frame responsive to the WUR frame as an ACK frame to transmit to the STA 1010 and may pass the frame as an MAC protocol data unit (MPDU) to a PHY logic circuitry. The PHY logic circuitry may encode and transform the data into OFDM symbols for transmission to the STA 1010. The PHY logic circuitry may generate a preamble to prepend the PHY service data unit (PSDU) (the MPDU) to form a PHY protocol data unit (PPDU) for transmission (element 4310). In some embodiments, more than one MPDU may be included in a PPDU.

The physical layer device such as the transmitter 3006 in FIG. 3 or the wireless network interfaces 1022 and 1052 in FIG. 1A may convert the PPDU to a communication signal (element 4315). The transmitter may then transmit the communication signal via the antenna (element 4320).

Referring to FIG. 4E, the flowchart 4400 begins with a receiver of a device such as the receiver 3004 in FIG. 3 receiving a communication signal via one or more antenna(s) such as an antenna element of antenna array 3018 (element 4410). The receiver may convert the communication signal into an MPDU in accordance with the process described in the preamble (element 4415). More specifically, the received signal is fed from the one or more antennas to a DBF such as the DBF 220. The DBF transforms the antenna signals into information signals. The output of the DBF is fed to OFDM such as the OFDM 3022 in FIG. 3. The OFDM extracts signal information from the plurality of subcarriers onto which information-bearing signals are modulated. Then, the demodulator such as the demodulator 3024 demodulates the signal information via, e.g., BPSK, 16-QAM (quadrature amplitude modulation), 64-QAM, 256-QAM, quadrature phase shift keying (QPSK), or staggered quadrature phase shift keying (SQPSK). And the decoder such as the decoder 3026 decodes the signal information from the demodulator via, e.g., BCC or LDPC, to extract the MPDU and pass or communicate the MPDU to MAC layer logic such as MAC logic circuitry 3001 (element 4420).

The MAC logic circuitry may determine frame field values from the MPDU (element 4425) such as the management frame fields in the management frame 2400 shown in FIG. 2F. For instance, the MAC logic circuitry may determine frame field values such as the type and subtype field values of the synch frame. The MAC sublayer logic may determine that the MPDU comprises a WUR beacon frame so the MAC logic circuitry may generate a response frame.

FIGS. 4F-G depict embodiments of flowcharts 4500 and 4530 to transmit communications with a frame. Referring to FIG. 4F, the flowchart 4500 may begin with a PCR of a station, such as the STA 1010 shown in FIG. 1A, generating one or more 802.11 preambles for transmission in a WUR PPDU on a channel (element 4510) such as a legacy preamble and high-efficiency preambles shown in FIG. 1E or the legacy 802.11 preamble shown in FIG. 1F. For embodiments that include legacy preambles followed by one or more WUR packets on one or more sub-channels, the WUR (WUR logic circuitry 1050 and/or WUR circuitry 1054) of the STA 1030 may generate one or more BPSK-modulation OFDM symbols (element 4512) to demark the start of a WUR packet transmission at the bandwidth of the channel rather than the bandwidth of the sub-channel of the corresponding WUR packet. For instance, an 80 MHz OFDMA transmission may include four contiguous channels and one 20 MHz bandwidth OFDMA packet transmission (a WUR PPDU) on each of the four contiguous channels. Furthermore, each 20 MHz OFDMA transmission may include a WUR packet transmission on one or more of the center RUs of each of the four channels. In other embodiments, the 80 MHz OFDMA transmission may include two contiguous channels and one 40 MHz bandwidth OFDMA packet transmission (WUR PPDU) on each of the two contiguous channels.

A MAC logic circuitry 1018 of the PCR 1080 of the STA 1010 may generate the WUR PPDU with an orthogonal frequency division multiple access (OFDMA), multicarrier frame including one or more wake-up radio (WUR) packets on one or more sub-channels or RUs of the channel to transmit to other devices of a network concurrently. Each wake-up radio (WUR) packet may include the wake-up radio preamble (element 4515) and a frame body. The wake-up radio preamble may be a low data rate (LDR) wake-up radio preamble to identify a data rate for transmission of a MAC frame in the WUR packet as 62.5 kbps or a high data rate (HDR) preamble to identify a data rate for transmission of a MAC frame in the WUR packet as 250 kbps. The frame body may be the MAC frame and may include, e.g., a frame control field, an address or other value in a field to identify the source or destination device, a payload, and an FCS, MIC, and/or CRC. In some embodiments, the wake-up radio preamble or the MAC frame may indicate a mode of operation such as a WURx mode or a VSM.

The MAC logic circuitry 1018 may pass the MAC frame as an MAC protocol data unit (MPDU) to a PHY logic circuitry 1053 and the WUR circuitry 1054. The WUR circuitry 1054 in conjunction with portions of the PHY logic circuitry 1053 may transform the MPDU into a packet of OFDM symbols that can transmit to the STA 1010 via the RX/TX circuitry 1055 after transmission of the one or more 802.11 preambles.

The wireless network interface 1052 may transmit a wake-up radio preamble on a sub-band of the channel after transmission of the one or more 802.11 preambles across the bandwidth of the channel. The wireless network interface 1052 may transmit the remainder of the WUR packet after transmission of the wake-up radio preamble as one or more OOK symbols at a rate associated with the wake-up radio preamble for transmission on the sub-band (element 4520). In several embodiments, the wake-up radio preamble transmits at a fixed rate such as 2 microseconds per symbol, wherein a symbol is one bit.

Referring to FIG. 4G, the flowchart 4530 begins with a WUR of a station such as the WUR logic circuitry 1020 and/or WUR circuitry 1024 of the STA 1010 in FIG. 1A determining a MAC frame to transmit a wake-up packet (WUP) to a WURx of a station such as the STA 1030 in FIG. 1A (element 4532) in a WUR PPDU such as the WUR PPDU discussed in conjunction with the flowchart 4500. The WUR may generate the MAC frame as a WUP in a WURx mode as a WURx operation. For example, the WUR may generate a WUP to instruct a WURx to wake the PCR associated with the WURx.

After generation of the MAC frame, the WUR may pass the MAC frame to the PHY to generate OOK OFDM symbols for transmission in the OFDMA packet on a sub-band of the channel (element 4534) with 2-microsecond pulses and a preamble to indicate a high data rate (HDR) transmission for the MAC frame. For example, the PHY may cause the WUR preamble to signal the HDR and the MAC frame to transmit via a radio and antenna array on a center sub-band of a 20 MHz channel at the HDR of 250 kbps.

Figure 4I:
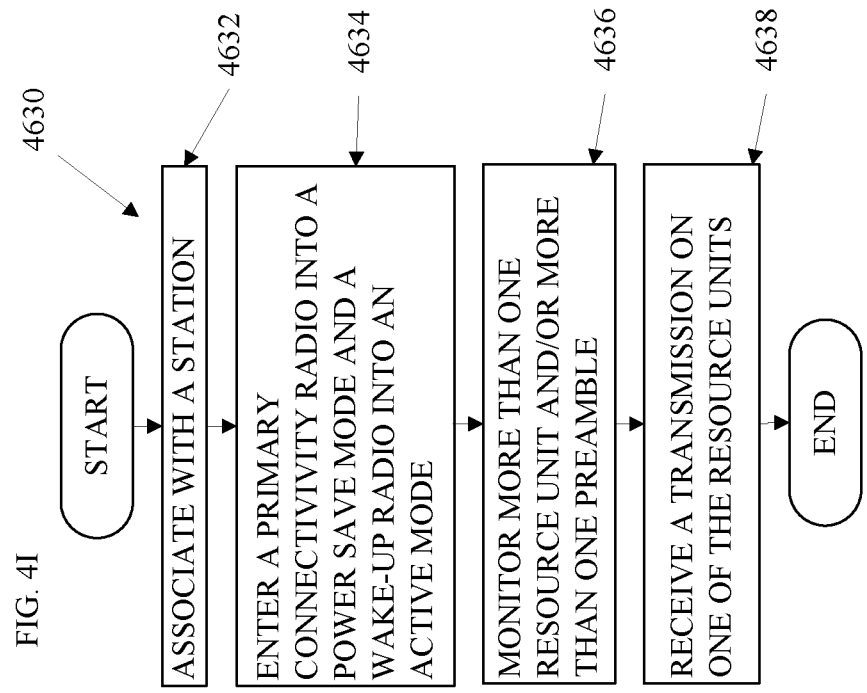
FIGS. 4H-I depict embodiments of flowcharts to generate and receive wake-up radio frames with wake-up packets or vendor specific packets for communications between wireless communication devices.
Figure 4H:
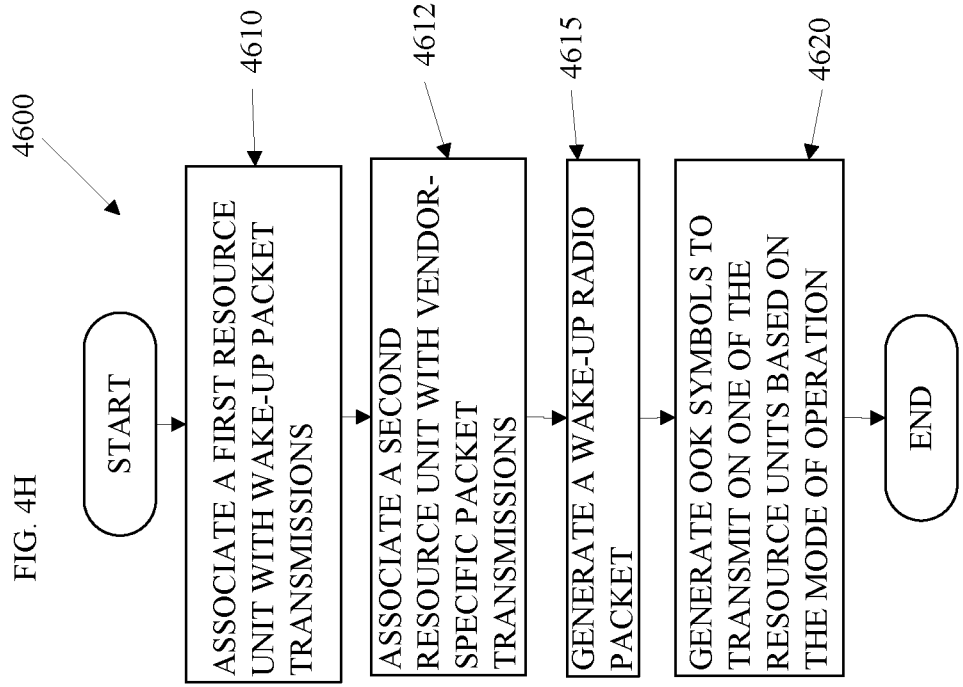

Referring to FIG. 4H, the flowchart 4600 begins with associating a first resource unit with wake-up packet (WUP)

transmissions (element 4610) and associating a second resource unit with vendor-specific (VS) packets (element 4612).

Thereafter, the STA may generate the WUPs (element 4615). The station may also generate OOK OFDM symbols to transmit on one of the RUs based on the mode of operation (element 4620).

Referring to FIG. 4I, the flowchart 4630 begins with associating with a station (element 4632). The PCR 1082 of the STA may enter a primary connectivity radio into a power save mode and a wake-up radio into an active mode (element 4634). The STA may monitor more than one resource unit and/or more than one preamble (element 4636). The STA may receive transmission on one of the resource units (element 4636).

Figure 5:
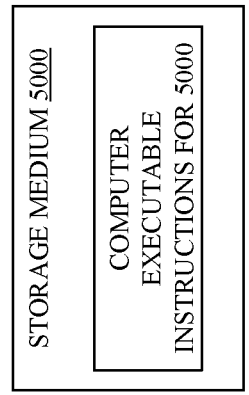
FIGS. 5-6 included herein to depict a computer-readable storage medium and a computing platform to support compatible low rate for wake-up radio packet transmission.

FIG. 5 illustrates an example of a storage medium 5000 to store pre-population logic such as one or more pre-population executables. Storage medium 5000 may comprise an article of manufacture. In some examples, storage medium 5000 may include any non-transitory computer readable medium or machine-readable medium, such as an optical, magnetic or semiconductor storage. Storage medium 5000 may store diverse types of computer executable instructions, such as instructions to implement logic flows and/or techniques described herein. Examples of a computer readable or machine-readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like.

Figure 6:
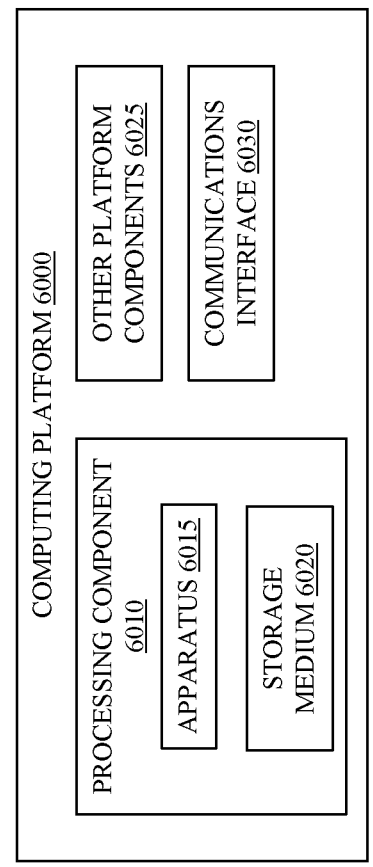

FIG. 6 illustrates an example computing platform 6000 such as the STAs 1010, 1030, 1090, 1092, 1094, 1096, and 1098 in FIG. 1A. In some examples, as shown in FIG. 6, computing platform 6000 may include a processing component 6010, other platform components or a communications interface 6030 such as the wireless network interfaces 1022 and 1052 shown in FIG. 1A. According to some examples, computing platform 6000 may be a computing device such as a server in a system such as a data center or server farm that supports a manager or controller for managing configurable computing resources as mentioned above. Furthermore, the communications interface 6030 may comprise a wake-up radio (WUR) and may be capable of waking up a primary connectivity radio (PCR) of the computing platform 6000.

According to some examples, processing component 6010 may execute processing operations or logic for apparatus 6015 described herein. Processing component 6010 may include various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits (ICs), application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements, which may reside in the storage medium 6020, may include software components, programs, applications, computer programs, application programs, device drivers, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. While discussions herein describe elements of embodiments as software elements and/or hardware elements, decisions to implement an embodiment using hardware elements and/or software elements may vary in accordance with any number of design considerations or factors, such as desired computational rate, power levels, heat tolerances, processing cycle budget, input data rates, output data rates, memory resources, data bus speeds and other design or performance constraints.

In some examples, other platform components 6025 may include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., universal serial bus (USB) memory), solid state drives (SSD) and any other type of storage media suitable for storing information.

In some examples, communications interface 6030 may include logic and/or features to support a communication interface. For these examples, communications interface 6030 may include one or more communication interfaces that operate according to various communication protocols or standards to communicate over direct or network communication links. Direct communications may occur via use of communication protocols or standards described in one or more industry standards (including progenies and variants) such as those associated with the Peripheral Component Interconnect (PCI) Express specification. Network communications may occur via use of communication protocols or standards such as those described in one or more Ethernet standards promulgated by the Institute of Electrical and Electronics Engineers (IEEE). For example, one such Ethernet standard may include IEEE 802.3-2012, Carrier sense Multiple access with Collision Detection (CSMA/CD) Access Method and Physical Layer Specifications, Published in December 2012 (hereinafter "IEEE 802.3"). Network communication may also occur according to one or more OpenFlow specifications such as the OpenFlow Hardware Abstraction API Specification. Network communications may also occur according to Infiniband Architecture Specification, Volume 1, Release 1.3, published in March 2015 ("the Infiniband Architecture specification").

Computing platform 6000 may be part of a computing device that may be, for example, a server, a server array or server farm, a web server, a network server, an Internet server, a work station, a mini-computer, a main frame computer, a supercomputer, a network appliance, a web appliance, a distributed computing system, multiprocessor systems, processor-based systems, or combination thereof. Accordingly, various embodiments of the computing platform 6000 may include or exclude functions and/or specific configurations of the computing platform 6000 described herein.

The components and features of computing platform 6000 may comprise any combination of discrete circuitry, ASICs, logic gates and/or single chip architectures. Further, the features of computing platform 6000 may comprise microcontrollers, programmable logic arrays and/or microprocessors or any combination of the foregoing where suitably appropriate. Note that hardware, firmware and/or software elements may be collectively or individually referred to herein as "logic".

One or more aspects of at least one example may comprise representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that make the logic or processor.

Some examples may include an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner, or syntax, for instructing a machine, computing device or system to perform a certain function. The instructions may be implemented using any suitable high-level, low-level, object-oriented, visual, compiled and/or interpreted programming language.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus, the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Several embodiments have one or more potentially advantages effects. For instance, generating an OOK OFDM signal to transmit a wake-up radio packet, advantageously facilitates a low power, low cost wake-up radio and wake-up radio packet transmissions as part of OFDMA transmissions to increase spectral utilization. Generating a OFDM symbols of an IEEE 802.11 preamble on a channel followed by OOK symbols of the wake-up radio packet on a sub-band of the channel advantageously facilitates a low power, low cost wake-up radio and wake-up radio packet transmissions as part of OFDMA transmissions to increase spectral utilization. Generating at least a second wake-up radio packet to transmit on a contiguous channel bandwidth with OOK OFDM symbols on a sub-band of the contiguous channel bandwidth advantageously facilitates a low power, low cost wake-up radio and wake-up radio packet transmissions as part of OFDMA transmissions to increase spectral utilization. Generating or decoding different preambles advantageously facilitates a low power, low cost wake-up radio and wake-up radio packet transmissions as part of OFDMA transmissions to increase spectral utilization. Generating or decoding different preambles to determine different data rates for transmission of a MAC frame advantageously facilitates a low power, low cost wake-up radio and wake-up radio packet transmissions as part of OFDMA transmissions to increase spectral utilization. Generating or decoding different preambles, wherein the preambles comprises a first preamble to signal a high data rate or a second preamble to signal a low data rate, the first preamble and the second preamble to have different counts of OFDM symbols advantageously facilitates a low power, low cost wake-up radio and wake-up radio packet transmissions as part of OFDMA transmissions to increase spectral utilization. Generating or decoding different preambles, wherein the preambles comprises a first preamble to signal a high data rate or a second preamble to signal a low data rate, wherein the second preamble is longer than the first preamble advantageously facilitates a low power, low cost wake-up radio and wake-up radio packet transmissions as part of OFDMA transmissions to increase spectral utilization.

EXAMPLES OF FURTHER EMBODIMENTS

The following examples pertain to further embodiments. Specifics in the examples may be used anywhere in one or more embodiments.

Example 1 is an apparatus to communicate a wake-up radio packet, the apparatus comprising: a memory; and logic circuitry coupled with the memory to generate a wake-up radio (WUR) packet with a 4 megahertz (MHz) bandwidth, wherein the WUR packet comprises an on-off keying (OOK) signal, a preamble of the WUR packet to indicate a rate of transmission of one or more OOK orthogonal frequency-division multiplexing (OFDM) symbols of a medium access control (MAC) frame of the WUR packet, wherein the preamble comprises a first preamble to signal a high data rate or a second preamble to signal a low data rate, the first preamble and the second preamble to have different bit counts, wherein a length in bits of the second preamble is twice a length in bits of the first preamble. In Example 2, the apparatus of example 1, further comprising a processor, a memory coupled with the processor, a radio coupled with a physical layer device, and one or more antennas coupled with the radio to transmit a wake-up radio (WUR) physical layer protocol data unit (PPDU) with a wide bandwidth preamble, the wide bandwidth preamble having a bandwidth between 20 megahertz (MHz) and 80 MHz, followed by OOK OFDM symbols of the WUR packet on a sub-band of a channel. In Example 3, the apparatus of example 1, wherein the rate of transmission of one OOK OFDM symbol of the MAC frame of the WUR packet is set to the rate of transmission of 62.5 kilobits per second for the low data rate. In Example 4, the apparatus of example 3, the second preamble to signal the low data rate of 62.5 kilobits per second. In Example 5, the apparatus of example 4, the second preamble to transmit with a duration of 128 microseconds. In Example 6, the apparatus of example 4, the logic circuitry to generate one WUR packet in a 20 MHz channel, two WUR packets in a 40 MHz channel, or four WUR packets in an 80 MHz channel. In Example 7, the apparatus of example 1, wherein the rate of transmission of one OOK OFDM symbol of the MAC frame of the WUR packet is set to the rate of transmission of 250 kilobits per second for the high data rate. In Example 8, the apparatus of example 7, the first preamble to signal the high data rate of 250 kilobits per second. In Example 9, the apparatus of example 8, the first preamble to transmit with a duration of 64 microseconds. In Example 10, the apparatus of example 8, the first preamble to comprise 32 bits. In Example 11, the apparatus of Example 2, the WUR PPDU comprising a mark having a 20 MHz bandwidth, the mark comprising a Binary Phase-shift keying (BPSK)-modulated OFDM symbol Example 12 is a method to communicate a wake-up radio packet, the method comprising: generating, by physical layer (PHY) logic circuitry, a wake-up radio (WUR) physical layer protocol data unit (PPDU) with a wide bandwidth preamble, the wide bandwidth preamble having a bandwidth between 20 megahertz (MHz) and 80 MHz, the WUR PPDU comprising a WUR packet with a 4 MHz bandwidth, wherein the WUR packet comprises an on-off keying (OOK) signal, a preamble of the WUR packet to indicate a rate of transmission of one or more OOK orthogonal frequency-division multiplexing (OFDM) symbols of a medium access control (MAC) frame of the WUR packet, wherein the preamble comprises a first preamble to signal a high data rate or a second preamble to signal a low data rate, the first preamble and the second preamble to have different bit counts, wherein a length in bits of the second preamble is twice a length in bits of the first preamble; and communicating the WUR packet to a physical layer device coupled with the MAC logic circuitry to transmit OFDM symbols of an IEEE 802.11 preamble on a channel followed by OOK OFDM symbols of the WUR packet on a sub-band of a channel. In Example 13, the method of example 12, wherein the rate of transmission of one OOK OFDM symbol of the MAC frame of the WUR packet is set to the rate of transmission of 62.5 kilobits per second for the low data rate. In Example 14, the method of example 13, the second preamble to signal the low data rate of 62.5 kilobits per second. In Example 15, the method of example 14, the second preamble to transmit with a duration of 128 microseconds. In Example 16, the method of example 14, the PHY logic circuitry to generate one WUR packet in a 20 MHz channel, two WUR packets in a 40 MHz channel, or four WUR packets in an 80 MHz channel. In Example 16, the method of example 12, wherein the rate of transmission of one OOK OFDM symbol of the MAC frame of the WUR packet is set to the rate of transmission of 250 kilobits per second for the high data rate. In Example 18, the method of example 17, the first preamble to signal the high data rate of 250 kilobits per second. In Example 19, the method of example 18, the first preamble to transmit with a duration of 64 microseconds. In Example 20, the method of example 18, the first preamble to comprise 32 bits. In Example 21, the method of Example 13, wherein the WUR packet is transmitted on a subchannel of a transmission of a WUR physical layer protocol data unit (PPDU) comprising a mark having a 20 MHz bandwidth, the mark comprising a Binary Phase-shift keying (BPSK)-modulated OFDM symbol.

Example 22 is a system to communicate a wake-up radio packet, the apparatus comprising: one or more antennas; a radio coupled with the one or more antennas; a memory; a baseband processor coupled with the memory to generate a wake-up radio (WUR) packet with a 4 megahertz (MHz) bandwidth, wherein the WUR packet comprises an on-off keying (OOK) signal, a preamble of the WUR packet to indicate a rate of transmission of one or more OOK orthogonal frequency-division multiplexing (OFDM) symbols of a medium access control (MAC) frame of the WUR packet, wherein the preamble comprises a first preamble to signal a high data rate or a second preamble to signal a low data rate, the first preamble and the second preamble to have different bit counts, wherein a length in bits of the second preamble is twice a length in bits of the first preamble; and a physical layer device coupled with the baseband processor to generate OFDM symbols of an IEEE 802.11 preamble for transmission on a channel followed by generation of OOK OFDM symbols of the WUR packet for transmission on a sub-band of the channel. In Example 23, the system of example 22, further comprising a memory coupled with the baseband processor, a radio coupled with the physical layer device, and one or more antennas coupled with the radio to transmit an orthogonal frequency-division multiple access (OFDMA) modulated signal. In Example 24, the system of example 22, wherein the rate of transmission of one OOK OFDM symbol of the MAC frame of the WUR packet is set to the rate of transmission of 62.5 kilobits per second for the low data rate. In Example 25, the system of example 24, the second preamble to signal the low data rate of 62.5 kilobits per second. In Example 26, the system of example 25, the second preamble to transmit with a duration of 128 microseconds. In Example 27, the system of example 25, the physical layer device to generate one WUR packet in a 20 MHz channel, two WUR packets in a 40 MHz channel, or four WUR packets in an 80 MHz channel. In Example 28, the system of example 22, wherein the rate of transmission of one OOK OFDM symbol of the MAC frame of the WUR packet is set to the rate of transmission of 250 kilobits per second for the high data rate. In Example 29, the system of example 28, the first preamble to signal the high data rate of 250 kilobits per second. In Example 30, the system of example 29, the first preamble to transmit with a duration of 64 microseconds. In Example 31, the system of example 29, the first preamble to comprise 32 bits.

Example 32 is a non-transitory computer-readable medium, comprising instructions to communicate a wake-up radio packet, which when executed by a processor, cause the processor to perform operations to: generate, by a logic circuitry of a primary connectivity radio (PCR) of a first device, generate a wake-up radio (WUR) physical layer protocol data unit (PPDU) with a wide bandwidth preamble, the wide bandwidth preamble having a bandwidth between 20 megahertz (MHz) and 80 MHz, the WUR PPDU comprising a WUR packet with a 4 MHz bandwidth, wherein the WUR packet comprises an on-off keying (OOK) signal, a preamble of the WUR packet to indicate a rate of transmission of one or more OOK orthogonal frequency-division multiplexing (OFDM) symbols of a medium access control (MAC) frame of the WUR packet, wherein the preamble comprises a first preamble to signal a high data rate or a second preamble to signal a low data rate, the first preamble and the second preamble to have different bit counts, wherein a length in bits of the second preamble is twice a length in bits of the first preamble; and cause transmission of the WUR packet. In Example 33, the non-transitory computer-readable medium of example 32, wherein the rate of transmission of one OOK OFDM symbol of the MAC frame of the WUR packet is set to the rate of transmission of 62.5 kilobits per second for the low data rate. In Example 34, the non-transitory computer-readable medium of example 33, the second preamble to signal the low data rate of 62.5 kilobits per second. In Example 35, the non-transitory computer-readable medium of example 34, the second preamble to transmit with a duration of 128 microseconds. In Example 36, the non-transitory computer-readable medium of example 34, the logic circuitry to generate one WUR packet in a 20 MHz channel, two WUR packets in a 40 MHz channel, or four WUR packets in an 80 MHz channel. In Example 37, the non-transitory computer-readable medium of example 32, wherein the rate of transmission of one OOK OFDM symbol of the MAC frame of the WUR packet is set to the rate of transmission of 250 kilobits per second for the high data rate. In Example 38, the non-transitory computer-readable medium of example 37, the first preamble to signal the high data rate of 250 kilobits per second. In Example 39, the non-transitory computer-readable medium of example 36, the first preamble to transmit with a duration of 64 microseconds. In Example 40, the non-transitory computer-readable medium of example 36, the first preamble to comprise 32 bits.

Example 41 is an apparatus to communicate a wake-up radio packet, the apparatus comprising: a means for generating a wake-up radio (WUR) physical layer protocol data unit (PPDU) with a wide bandwidth preamble, the wide bandwidth preamble having a bandwidth between 20 megahertz (MHz) and 80 MHz, the WUR PPDU comprising a WUR packet with a 4 MHz bandwidth, wherein the WUR packet comprises an on-off keying (OOK) signal, a preamble of the WUR packet to indicate a rate of transmission of one or more OOK orthogonal frequency-division multiplexing (OFDM) symbols of a medium access control (MAC) frame of the WUR packet, wherein the preamble comprises a first preamble to signal a high data rate or a second preamble to signal a low data rate, the first preamble and the second preamble to have different bit counts, wherein a length in bits of the second preamble is twice a length in bits of the first preamble; and a means for communicating the WUR packet. In Example 42, the apparatus of example 41, further comprising a processor, a memory coupled with the processor, a radio coupled with the physical layer device, and one or more antennas coupled with the radio to transmit an orthogonal frequency-division multiple access (OFDMA) modulated signal. In Example 43, the apparatus of example 41, wherein the rate of transmission of one OOK OFDM symbol of the MAC frame of the WUR packet is set to the rate of transmission of 62.5 kilobits per second for the low data rate. In Example 44, the apparatus of example 43, the second preamble to signal the low data rate of 62.5 kilobits per second. In Example 45, the apparatus of example 44, the second preamble to transmit with a duration of 128 microseconds. In Example 46, the apparatus of example 44, the means for generating to generate one WUR packet in a 20 MHz channel, two WUR packets in a 40 MHz channel, or four WUR packets in an 80 MHz channel. In Example 47, the apparatus of example 41, wherein the rate of transmission of one OOK OFDM symbol of the MAC frame of the WUR packet is set to the rate of transmission of 250 kilobits per second for the high data rate. In Example 48, the apparatus of example 47, the first preamble to signal the high data rate of 250 kilobits per second. In Example 49, the apparatus of example 46, the first preamble to transmit with a duration of 64 microseconds. In Example 50, the apparatus of example 46, the first preamble to comprise 32 bits.

Example 51 is an apparatus to communicate a wake-up radio packet, the apparatus comprising: memory; and a logic circuitry to decode a wake-up radio (WUR) packet, wherein the WUR packet comprises an on-off keying (OOK) signal, a preamble of the WUR packet to indicate a rate of transmission of one or more OOK orthogonal frequency-division multiplexing (OFDM) symbols of a medium access control (MAC) frame of the WUR packet, wherein the preamble comprises a first preamble to signal a high data rate or a second preamble to signal a low data rate, the first preamble and the second preamble to have different bit counts, wherein a length in bits of the second preamble is twice a length in bits of the first preamble. In Example 52, the apparatus of example 51, further comprising a processor, a memory coupled with the processor, a radio coupled with a physical layer device, and one or more antennas coupled with the radio to receive OOK OFDM symbols of the WUR packet on a channel. In Example 53, the apparatus of example 51, wherein the rate of transmission of one OOK OFDM symbol of the MAC frame of the WUR packet is set to the rate of transmission of 62.5 kilobits per second for the low data rate. In Example 54, the apparatus of example 53, the second preamble to signal the low data rate of 62.5 kilobits per second. In Example 55, the apparatus of example 54, the second preamble to transmit with a duration of 128 microseconds. In Example 54, the apparatus of example 52, the logic circuitry to decode one of one WUR packet in a 20 MHz channel, two WUR packets in a 40 MHz channel, or four WUR packets in an 80 MHz channel. In Example 57, the apparatus of example 151, wherein the rate of transmission of one OOK OFDM symbol of the MAC frame of the WUR packet is set to the rate of transmission of 250 kilobits per second for the high data rate. In Example 58, the apparatus of example 57, the first preamble to signal the high data rate of 250 kilobits per second. In Example 59, the apparatus of example 58, the first preamble to transmit with a duration of 64 microseconds. In Example 60, the apparatus of example 58, the first preamble to comprise 32 bits.

Example 61 is a method to communicate a wake-up radio packet, the method comprising: decoding, by a physical layer device, a wake-up radio (WUR) packet, wherein the WUR packet comprises an on-off keying (OOK) signal, a preamble of the WUR packet to indicate a rate of transmission of one or more OOK orthogonal frequency-division multiplexing (OFDM) symbols of a medium access control (MAC) frame of the WUR packet, wherein the preamble comprises a first preamble to signal a high data rate or a second preamble to signal a low data rate, the first preamble and the second preamble to have different bit counts, wherein a length in bits of the second preamble is twice a length in bits of the first preamble; and passing the MAC frame to a MAC logic circuitry. In Example 62, the method of example 61, wherein the rate of transmission of one OOK OFDM symbol of the MAC frame of the WUR packet is set to the rate of transmission of 62.5 kilobits per second for the low data rate. In Example 63, the method of example 62, the second preamble to signal the low data rate of 62.5 kilobits per second. In Example 64, the method of example 63, the second preamble to transmit with a duration of 128 microseconds. In Example 65, the method of example 63, the physical layer device to decode one of one WUR packet in a 20 MHz channel, two WUR packets in a 40 MHz channel, or four WUR packets in an 80 MHz channel. In Example 66, the method of example 61, wherein the rate of transmission of one OOK OFDM symbol of the MAC frame of the WUR packet is set to the rate of transmission of 250 kilobits per second for the high data rate. In Example 67, the method of example 66, the first preamble to signal the high data rate of 250 kilobits per second. In Example 68, the method of example 67, the first preamble to transmit with a duration of 64 microseconds. In Example 69, the method of example 67, the first preamble to comprise 32 bits.

Example 70 is a system to communicate a wake-up radio packet, the apparatus comprising: one or more antennas; a radio coupled with the one or more antennas; a physical layer device coupled with the radio to decode a wake-up radio (WUR) packet, wherein the WUR packet comprises an on-off keying (OOK) signal, a preamble of the WUR packet to indicate a rate of transmission of one or more OOK orthogonal frequency-division multiplexing (OFDM) symbols of a medium access control (MAC) frame of the WUR packet, wherein the preamble comprises a first preamble to signal a high data rate or a second preamble to signal a low data rate, the first preamble and the second preamble to have different bit counts, wherein a length in bits of the second preamble is twice a length in bits of the first preamble; and a baseband processor coupled with the physical layer device parse the MAC frame to interpret the MAC frame. In Example 71, the system of example 70, wherein the rate of transmission of one OOK OFDM symbol of the MAC frame of the WUR packet is set to the rate of transmission of 62.5 kilobits per second for the low data rate. In Example 72, the system of example 71, the second preamble to signal the low data rate of 62.5 kilobits per second. In Example 73, the system of example 72, the second preamble to transmit with a duration of 128 microseconds. In Example 74, the system of example 72, the physical layer device to decode one of one WUR packet in a 20 MHz channel, two WUR packets in a 40 MHz channel, or four WUR packets in an 80 MHz channel. In Example 75, the system of example 71, wherein the rate of transmission of one OOK OFDM symbol of the MAC frame of the WUR packet is set to the rate of transmission of 250 kilobits per second for the high data rate. In Example 76, the system of example 75, the first preamble to signal the high data rate of 250 kilobits per second. In Example 77, the system of example 76, the first preamble to transmit with a duration of 64 microseconds. In Example 78, the system of example 76, the first preamble to comprise 32 bits.

Example 79 is a non-transitory computer-readable medium, comprising instructions to communicate a WUR packet, which when executed by a processor, cause the processor to perform operations to: decode, by a physical layer device, a wake-up radio (WUR) packet, wherein the WUR packet comprises an on-off keying (OOK) signal, a preamble of the WUR packet to indicate a rate of transmission of one or more OOK orthogonal frequency-division multiplexing (OFDM) symbols of a medium access control (MAC) frame of the WUR packet, wherein the preamble comprises a first preamble to signal a high data rate or a second preamble to signal a low data rate, the first preamble and the second preamble to have different bit counts, wherein a length in bits of the second preamble is twice a length in bits of the first preamble; and pass the MAC frame to a MAC logic circuitry. In Example 80, the non-transitory computer-readable medium of example 79, wherein the rate of transmission of one OOK OFDM symbol of the MAC frame of the WUR packet is set to the rate of transmission of 62.5 kilobits per second for the low data rate. In Example 81, the non-transitory computer-readable medium of example 80, the second preamble to signal the low data rate of 62.5 kilobits per second. In Example 82, the non-transitory computer-readable medium of example 81, the second preamble to transmit with a duration of 128 microseconds. In Example 83, the non-transitory computer-readable medium of example 81, the physical layer device to decode one of one WUR packet in a 20 MHz channel, two WUR packets in a 40 MHz channel, or four WUR packets in an 80 MHz channel. In Example 84, the non-transitory computer-readable medium of example 79, wherein the rate of transmission of one OOK OFDM symbol of the MAC frame of the WUR packet is set to the rate of transmission of 250 kilobits per second for the high data rate. In Example 85, the non-transitory computer-readable medium of example 84, the first preamble to signal the high data rate of 250 kilobits per second. In Example 86, the non-transitory computer-readable medium of example 85, the first preamble to transmit with a duration of 64 microseconds. In Example 87, the non-transitory computer-readable medium of example 85, the first preamble to comprise 32 bits.

Example 88 is an apparatus to communicate a wake-up radio packet, the apparatus comprising: a means for decoding a wake-up radio (WUR) packet, wherein the WUR packet comprises an on-off keying (OOK) signal, a preamble of the WUR packet to indicate a rate of transmission of one or more OOK orthogonal frequency-division multiplexing (OFDM) symbols of a medium access control (MAC) frame of the WUR packet, wherein the preamble comprises a first preamble to signal a high data rate or a second preamble to signal a low data rate, the first preamble and the second preamble to have different bit counts, wherein a length in bits of the second preamble is twice a length in bits of the first preamble; and a means for passing the MAC frame to the MAC logic circuitry. In Example 89, the apparatus of example 88, wherein the rate of transmission of one OOK OFDM symbol of the MAC frame of the WUR packet is set to the rate of transmission of 62.5 kilobits per second for the low data rate. In Example 90, the apparatus of example 89, the second preamble to signal the low data rate of 62.5 kilobits per second. In Example 91, the apparatus of example 90, the second preamble to transmit with a duration of 128 microseconds. In Example 92, the apparatus of example 90, the means for decoding one of one WUR packet in a 20 MHz channel, two WUR packets in a 40 MHz channel, or four WUR packets in an 80 MHz channel. In Example 93, the apparatus of example 88, wherein the rate of transmission of one OOK OFDM symbol of the MAC frame of the WUR packet is set to the rate of transmission of 250 kilobits per second for the high data rate. In Example 94, the apparatus of example 93, the first preamble to signal the high data rate of 250 kilobits per second. In Example 95, the apparatus of example 94, the first preamble to transmit with a duration of 64 microseconds. In Example 96, the apparatus of example 94, the first preamble to comprise 32 bits.

What is claimed is:

1. An apparatus to communicate a wake-up radio (WUR) packet, the apparatus comprising:
a memory; and
a circuitry coupled with the memory;
a radio coupled with the circuitry;
one or more antennas coupled with the radio to transmit a wake-up radio (WUR) physical layer protocol data unit (PPDU) comprising a WUR packet, with a wide bandwidth preamble, the wide bandwidth preamble having a bandwidth having a 20 megahertz (MHz), 40 MHz, or 80 MHz contiguous bandwidth, followed by one or more on-off keying (OOK) orthogonal frequency-division multiplexing (OFDM) symbols of the WUR packet on a sub-band of a channel; and
the circuitry to generate and cause transmission of the WUR PPDU including the WUR packet, wherein the WUR packet comprises a preamble to indicate a rate of transmission of the one or more OFDM symbols of a medium access control (MAC) frame and the MAC frame, wherein the preamble comprises a high data rate (HDR) preamble to signal a high data rate or a low data rate (LDR) preamble to signal a low data rate, wherein a length in bits of the LDR preamble is twice a length in bits of the HDR preamble, wherein the HDR preamble has a 32 bit sequence with a transmission rate of 250 kilobits per second, wherein each bit in the 32 bit sequence has a two microsecond duration, wherein the MAC frame comprises an action frame, the action frame comprising a MAC header and a payload, wherein the MAC header comprises a receiver address field and the payload comprises an action identifier field and an action payload.

2. The apparatus of claim 1, wherein the rate of transmission of one OOK OFDM symbol of the MAC frame of the WUR packet is set to the rate of transmission of 62.5 kilobits per second for the low data rate.

3. The apparatus of claim 2, the LDR preamble to signal the low data rate of 62.5 kilobits per second.

4. The apparatus of claim 3, the LDR preamble to transmit with a duration of 128 microseconds.

5. The apparatus of claim 3, the circuitry to generate one WUR packet in a 20 MHz channel, two WUR packets in a 40 MHz channel, or four WUR packets in an 80 MHz channel.

6. The apparatus of claim 1, wherein the rate of transmission of one OOK OFDM symbol of the MAC frame of the WUR packet is set to the transmission rate of 250 kilobits per second for the high data rate.

7. The apparatus of claim 1, the WUR PPDU comprising a mark having a 20 MHz bandwidth, the mark comprising a Binary Phase-shift keying (BPSK)-modulated OFDM symbol.

8. A non-transitory computer-readable medium, comprising instructions to communicate a wake-up radio (WUR) packet, which when executed by circuitry, cause the circuitry to perform operations to:
generate, by the circuitry coupled with memory of a first device, a wake-up radio (WUR) physical layer protocol data unit (PPDU) comprising the WUR packet, with a wide bandwidth preamble, the wide bandwidth preamble having a 20 megahertz (MHz), 40 MHz, or 80 MHz contiguous bandwidth, followed by one or more on-off keying (OOK) orthogonal frequency-division multiplexing (OFDM) symbols of the WUR packet on a sub-band of a channel, wherein the WUR packet comprises a preamble to indicate a rate of transmission of the one or more OFDM symbols of a medium access control (MAC) frame and the MAC frame, wherein the preamble comprises a high data rate (HDR) preamble to signal a high data rate or a low data rate (LDR) preamble to signal a low data rate, wherein a length in bits of the LDR preamble is twice a length in bits of the HDR preamble, wherein the HDR preamble has a 32 bit sequence with a transmission rate of 250 kilobits per second, wherein each bit in the 32 bit sequence has a two microsecond duration, wherein the MAC frame comprises an action frame, the action frame comprising a MAC header and a payload, wherein the MAC header comprises a receiver address field and the payload comprises an action identifier field and an action payload; and
cause transmission of the WUR PPDU via a radio coupled with one or more antennas.

9. The non-transitory computer-readable medium of claim 8, wherein the rate of transmission of one OOK OFDM symbol of the MAC frame of the WUR packet is set to the rate of transmission of 62.5 kilobits per second for the low data rate.

10. The non-transitory computer-readable medium of claim 9, the LDR preamble to signal the low data rate of 62.5 kilobits per second.

11. The non-transitory computer-readable medium of claim 10, the LDR preamble to transmit with a duration of 128 microseconds.

12. The non-transitory computer-readable medium of claim 10, the circuitry to generate one WUR packet in a 20 MHz channel, two WUR packets in a 40 MHz channel, or four WUR packets in an 80 MHz channel.

13. The non-transitory computer-readable medium of claim 8, wherein the rate of transmission of one OOK OFDM symbol of the MAC frame of the WUR packet is set to the transmission rate of 250 kilobits per second for the high data rate.

14. The non-transitory computer-readable medium of claim 8, wherein the WUR packet is transmitted on a subchannel of a transmission of a WUR PPDU comprising a mark having a 20 MHz bandwidth, the mark comprising a Binary Phase-shift keying (BPSK)-modulated OFDM symbol.

15. An apparatus to communicate a wake-up radio (WUR) packet, the apparatus comprising:
memory;
a circuitry coupled with the memory,
a radio coupled with the circuitry, and
one or more antennas coupled with the radio to receive one or more on-off keying (OOK) orthogonal frequency-division multiplexing (OFDM) symbols of the WUR packet on a channel; and
the circuitry to decode the WUR packet received, wherein the WUR packet comprises a preamble to indicate a rate of transmission of the one or more OOK OFDM symbols of a medium access control (MAC) frame comprised by the WUR packet, wherein the preamble comprises a high data rate (HDR) preamble to signal a high data rate or a low data rate (LDR) preamble to signal a low data rate, wherein a length in bits of the LDR preamble is twice a length in bits of the HDR preamble, wherein the HDR preamble has a 32 bit sequence with a transmission rate of 250 kilobits per second, wherein each bit in the 32 bit sequence has a two microsecond duration, wherein the MAC frame comprises an action frame, the action frame comprising a MAC header and a payload, wherein the MAC header comprises a receiver address field and the payload comprises an action identifier field and an action payload.

16. The apparatus of claim 15, wherein the rate of transmission of one OOK OFDM symbol of the MAC frame of the WUR packet is set to the rate of transmission of 62.5 kilobits per second for the low data rate.

17. The apparatus of claim 16, the LDR preamble to signal the low data rate of 62.5 kilobits per second.

18. The apparatus of claim 17, the LDR preamble to transmit with a duration of 128 microseconds.

19. The apparatus of claim 17, the circuitry to decode one of one WUR packet in a 20 megahertz (MHz) channel, two WUR packets in a 40 MHz channel, or four WUR packets in an 80 MHz channel.

20. The apparatus of claim 15, wherein the rate of transmission of one OOK OFDM symbol of the MAC frame of the WUR packet is set to the transmission rate of 250 kilobits per second for the high data rate.

21. A non-transitory computer-readable medium, comprising instructions to communicate a wake-up radio (WUR) packet, which when executed by circuitry, cause the circuitry to perform operations to:
decode the WUR packet by the circuitry coupled with memory of a wake-up receiver, wherein the WUR packet comprises a preamble to indicate a rate of transmission of one or more on-off keying (OOK) orthogonal frequency-division multiplexing (OFDM) symbols of a medium access control (MAC) frame and the MAC frame, wherein the preamble comprises a high data rate (HDR) preamble to signal a high data rate or a low data rate (LDR) preamble to signal a low data rate, wherein a length in bits of the LDR preamble is twice a length in bits of the HDR preamble, wherein the HDR preamble has a 32 bit sequence with a transmission rate of 250 kilobits per second, wherein each bit in the 32 bit sequence has a two microsecond duration, wherein the MAC frame comprises an action frame, the action frame comprising a MAC header and a payload, wherein the MAC header comprises a receiver address field and the payload comprises an action identifier field and an action payload; and
pass the MAC frame to a MAC logic circuitry of the circuitry.

22. The non-transitory computer-readable medium of claim 21, wherein the rate of transmission of one OOK OFDM symbol of the MAC frame of the WUR packet is set to the rate of transmission of 62.5 kilobits per second for the low data rate.

23. The non-transitory computer-readable medium of claim 22, the LDR preamble to signal the low data rate of 62.5 kilobits per second.

24. The non-transitory computer-readable medium of claim 23, the LDR preamble to transmit with a duration of 128 microseconds.

25. The non-transitory computer-readable medium of claim 23, the circuitry to decode one of one WUR packet in a 20 megahertz (MHz) channel, two WUR packets in a 40 MHz channel, or four WUR packets in an 80 MHz channel.

26. The non-transitory computer-readable medium of claim 21, wherein the rate of transmission of one OOK OFDM symbol of the MAC frame of the WUR packet is set to the transmission rate of 250 kilobits per second for the high data rate.

* * * * *